United States Patent
Rourke et al.

(10) Patent No.: US 7,436,293 B2
(45) Date of Patent: *Oct. 14, 2008

(54) SYSTEM AND METHOD FOR CONFIGURING AND MAINTAINING INDIVIDUAL AND MULTIPLE ENVIRONMENTAL CONTROL UNITS OVER A COMMUNICATION NETWORK FROM AN ADMINISTRATION SYSTEM

(75) Inventors: Michael C. Rourke, Groton, MA (US); James K. Rumsey, Columbus, IN (US)

(73) Assignee: Quartet Technology, Inc, Dracut, MA (US)

( * ) Notice: Subject to any disclaimer, the term of this patent is extended or adjusted under 35 U.S.C. 154(b) by 80 days.

This patent is subject to a terminal disclaimer.

(21) Appl. No.: 11/379,780

(22) Filed: Apr. 21, 2006

(65) Prior Publication Data

US 2007/0250191 A1   Oct. 25, 2007

(51) Int. Cl.
G08B 26/00 (2006.01)
G08B 25/00 (2006.01)
G05B 23/02 (2006.01)
G09G 5/00 (2006.01)

(52) U.S. Cl. .................. 340/505; 340/506; 340/525; 340/3.1; 700/17; 700/83; 345/650; 345/156

(58) Field of Classification Search .............. 340/505, 340/506, 539.19, 525
See application file for complete search history.

(56) References Cited

U.S. PATENT DOCUMENTS

| | | | | | |
|---|---|---|---|---|---|
| 5,475,819 | A | * | 12/1995 | Miller et al. | 709/203 |
| 5,819,263 | A | * | 10/1998 | Bromley et al. | 707/3 |
| 5,956,487 | A | * | 9/1999 | Venkatraman et al. | 709/218 |
| 6,112,181 | A | * | 8/2000 | Shear et al. | 705/1 |
| 6,198,479 | B1 | * | 3/2001 | Humpleman et al. | 715/733 |
| 6,199,136 | B1 | * | 3/2001 | Shteyn | 710/305 |
| 6,957,186 | B1 | * | 10/2005 | Guheen et al. | 705/1 |
| 7,155,305 | B2 | * | 12/2006 | Hayes et al. | 700/224 |
| 7,187,279 | B2 | * | 3/2007 | Chung | 340/541 |
| 2002/0156860 | A1 | * | 10/2002 | Finke et al. | 709/208 |
| 2004/0255269 | A1 | * | 12/2004 | Santori et al. | 717/109 |
| 2005/0125083 | A1 | * | 6/2005 | Kiko | 700/19 |

* cited by examiner

Primary Examiner—Donnie L Crosland

(57) ABSTRACT

A method and system that allow an ECU to be conveniently configured based on the contents of an ECU configuration profile database that stores ECU user profiles and living environment profiles, and that generates a user interface for a selected remote ECU displaying selectable living environment devices, each of which corresponds to a type of living environment device that can be controlled by a user through that ECU. The user interface further displays a representation of a current configuration of the remotely located ECU, and enables the administrator user to move the selectable living environment device representations into the current configuration representation for the remotely located environmental control unit, for example by dragging and dropping the living environment device representations using a mouse user interface device coupled to a computer system on which the administration tool is executing.

13 Claims, 17 Drawing Sheets

SYSTEM AND METHOD FOR CONFIGURING AND MAINTAINING INDIVIDUAL AND MULTIPLE ENVIRONMENTAL CONTROL UNITS OVER A COMMUNICATION NETWORK FROM AN ADMINISTRATION SYSTEM

FIELD OF THE INVENTION

The present invention relates generally to controlling environmental control units, and more specifically to a system and method for configuring and maintaining individual and multiple environmental control units from an administration system over a communication network.

BACKGROUND OF THE INVENTION

Many people in the world have disabilities that make it difficult or impossible for them to control aspects of their physical living environment in the same ways that ordinary people can. For example, a disabled person may not easily be able to control various living environment devices, such as clocks, phones, beds, televisions, doors, lights, elevators, VCRs, DVD players, digital video recorders, CD players, cable television boxes, tape players, stereo systems, satellite television boxes, radios, fans, thermostats, doors, windows, microwave ovens, and others. To address this need, assistive devices, referred to herein for purposes of explanation as Environmental Control Units ("ECUs"), have been developed. An increasing number of people rely on ECUs to control aspects of their living environment on a day to day basis.

It is sometimes desirable to be able to maintain and/or configure one or more ECUs from a location different from that in which the ECUs are deployed. For example, a hospital, nursing home, or other temporary or permanent living facility for disabled persons may need to be able to conveniently change the overall operation of ECUs that are located in different living environments, such as rooms, and/or beds within rooms, etc., such that they conform with the living environments in which they are located, and/or with new or different ECU users. Additionally, it may also be desirable to be able to have the ability to monitor or change specific operational characteristics within a remote ECU from an administration system, especially for the purpose of troubleshooting problems with the ECU. Such functionality has been lacking in existing ECUs, since they have typically required that configuration be performed on a single ECU basis, through configuration interfaces that are local to the ECU. As a result, system administrators and ECU maintenance providers have had to physically visit the room in which a given ECU is located in order to change its configuration or troubleshoot a problem with the ECU's operation. These requirements have been cumbersome and inconvenient, since ECU specific reconfiguration may be required whenever a new ECU user moves into a room, or when a new living environment device is added to a room. Moreover, when a problem occurs with the operation of existing ECUs, troubleshooting can only be accomplished by going to the room in which the ECU is located, in order to access the local user interface of the ECU. The difficulty of having to go to the location of an ECU to perform troubleshooting or maintenance through a local interface to the ECU is further complicated when the ECU is located in a private residence, which may be miles from the system support provider.

For the above reasons and others, it would be desirable to have a new system for managing an ECU that allows multiple ECUs to be conveniently configured by a remote administrator user over a network, and that also allows effective remote access to specific configuration characteristics of individual ECUs.

SUMMARY OF THE INVENTION

To address the above described and other shortcomings of the prior art, a method and system are disclosed that allow an ECU to be conveniently configured based on the contents of an ECU configuration profile database that stores ECU user profiles and living environment profiles, and that is further operable to generate a user interface for a selected remote ECU displaying selectable living environment devices, each of which corresponds to a type of living environment device that can be controlled by a user through that ECU. The user interface further displays a representation of a current configuration of the remotely located ECU, and enables the administrator user to move the selectable living environment device representations into the current configuration representation for the remotely located environmental control unit, for example by dragging and dropping the living environment device representations using a mouse user interface device coupled to a computer system on which the administration tool is executing.

The ECU configuration profile database stores user profiles made up of user specific ECU configuration information, and living environment profiles made up of living environment specific ECU configuration information. Each user profile contains user specific characteristics that reflect an associated user's disability, physical characteristics and/or preferences. Each living environment profile contains living environment characteristics that describe the living environment devices located in an associated living environment, including information regarding how those devices can be controlled by an ECU.

With regard to modifying the current configuration of a selected ECU, the disclosed system operates to detect the user having moved one of the selectable living environment device representations into the representation of the current configuration of the remotely located environmental control unit, and in response to such detection sends one or more command messages over a computer network to the remotely located environmental control unit. The command messages indicate that the remotely located environmental control unit should perform at least one operation to allow a user to control a living environment device of the type corresponding to the living environment device representation moved into said representation of the current configuration of the remotely located environmental control unit.

In another aspect of the disclosed system, the administration tool is operable to generate a user interface that enables the user to indicate living environment device and user characteristics to be associated with the living environment device of the type corresponding to the living environment device representation moved into the current configuration of said remotely located environmental control unit. Living environment device characteristics are described further below, and may include a control source definition associated with the living environment device. Control source definitions may include and/or indicate a control source identifier and at least one address of the living environment device within a communication network, a control source identifier and/or a port interface of the environmental control unit to which the living environment device is communicably connected. The remotely located ECU performs at least one operation to internally associate the control source definition with an identifying name of the living environment device, as well as with various living environment and/or user characteristics used to control the living environment device through the ECU.

Thus there is disclosed a new system for managing an ECU that allows multiple ECUs to be conveniently configured by a remote administrator user over a network, and that also allows effective remote access to specific configuration characteristics of individual ECUs.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
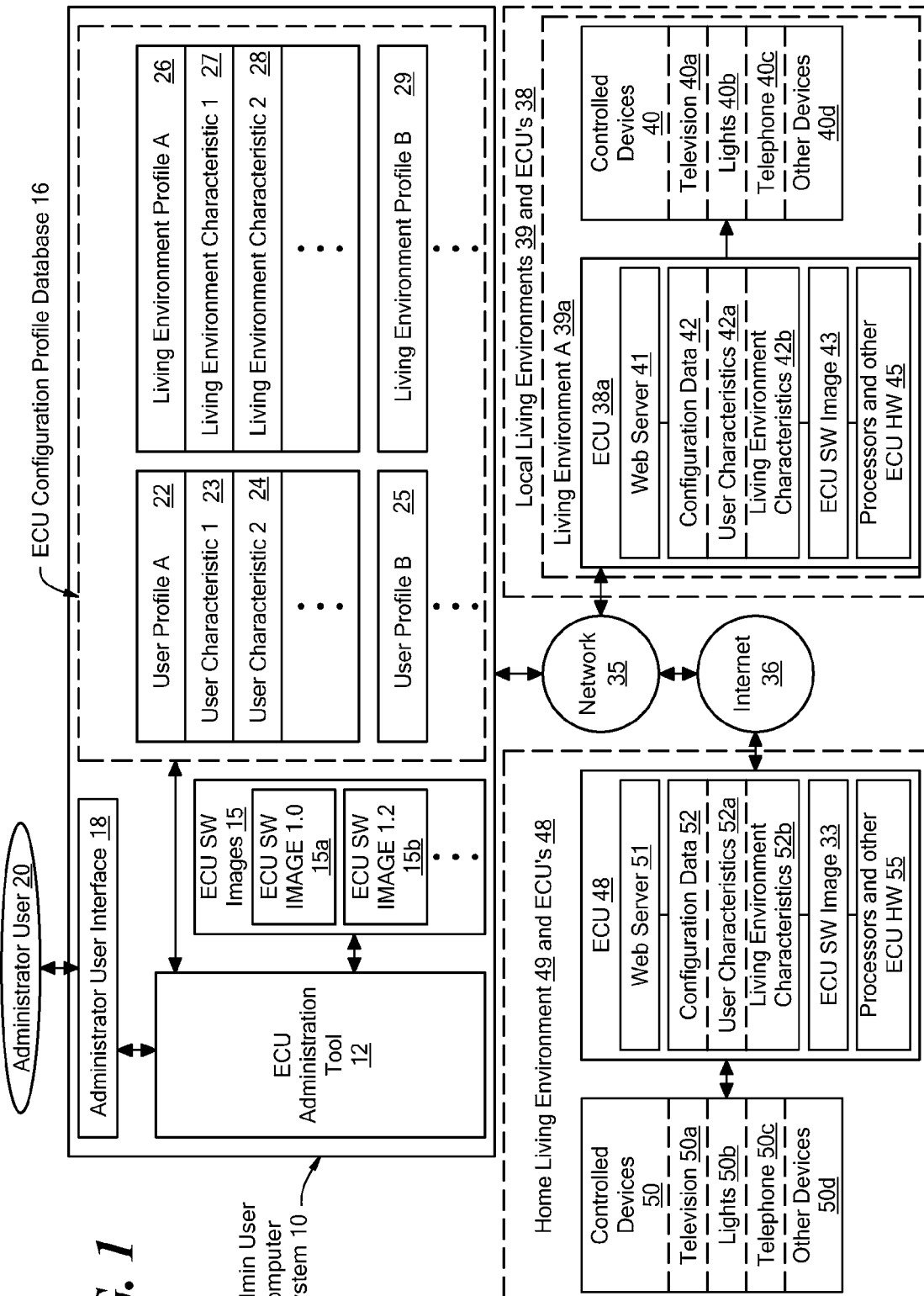
FIG. 1 is a block diagram showing hardware and software components in one operational environment for an illustrative embodiment of the disclosed system.

As shown in FIG. 1, an embodiment of the disclosed system may operate in an environment including an administrator user computer system 10, communicably connected to a network 35, which may further be connected to the Internet 36. A number of local living environments 39 and associated environment control units (ECUs) 38 are also shown in FIG. 1, including at least an illustrative ECU 38a located in and associated with an illustrative living environment 39a. A home living environment 49 is associated with an ECU 48 located within it. The ECUs 38, as illustrated by ECU 38a, are connected to a network 35, and the ECU 48 is connected to the Internet 36. The network 35 may consist of any type of communication network, such as, for example, a Local Area Network (LAN), a virtual private network (VPN), or some other specific type of communication network. For example, the local living environments 39 may be rooms or beds located in a hospital or other health care facility, while the home living environment may be a residence of an ECU user.

As further shown in FIG. 1, the administrator computer system 10 includes an ECU administration tool 12, which may, for example, consist of application program software. The administration tool 12 provides an administrator graphical user interface 18 to an administrator user 20. The administration tool 12 has access to a number of ECU executable software images 15 stored on the computer system 10, shown for purposes of illustration including an ECU software image version 1.0 15a, an ECU software image version 1.2 15b, etc. The administration tool 12 further has access to an ECU configuration profile database 16, which stores ECU user profiles and living environment profiles, shown for purposes of illustration including user profile A 22, user profile B 25, etc., and living environment profile A 26, living environment profile B 29, etc. Each of the user profiles stored in the ECU configuration profile database 16 includes a number of ECU user characteristics, shown for purposes of illustration by user characteristic 1 23, user characteristic 1 24, etc., for user profile A 22. Each of the living environment profiles stored in the ECU configuration profile database 16 includes a number of living environment characteristics, shown for purposes of illustration by living environment characteristic 1 27, living environment characteristic 2 28, etc. As further described below, each user profile stored in the database 16 may be uploaded from and/or downloaded into an ECU, and contains user specific characteristics that reflect an associated user's disability, physical characteristics and/or preferences. Also as further described below, each living environment profile stored in the database 16 may be uploaded from and/or downloaded into an ECU, and contains living environment characteristics that describe the living environment devices located in an associated living environment, including information regarding how those devices can be controlled by an ECU.

The database 16 may be embodied using any specific type of database, such as a relational database, non-relational database, or other type of database. The user profiles and living environment profiles may, for example, be stored as HTML (HyperText MarkUp Language) files, binary files, or other types of data. The living environment profiles and user profiles stored within the database 16 may include various specific types of data, such as HTML, binary data, and text data. For example, binary data within a user profile may include such things as a voice recognition profile for the user, and binary data within the living environment profile may include such things as infrared remote control command files associated with living environment devices that are controlled by the ECU. The user profiles and living environment profiles stored in the database 16 may each be stored in association with corresponding unique names or identifiers. For example, each of the user profiles may be associated with the name of a patient, while each of the living environment profiles may be associated with a room or bed within a hospital or assisted living facility.

The ECU software images 15 may be stored in any specific type of data repository, and may consist of executable code images that may be transferred to or obtained by the computer system 10 through a variety of specific communication mechanisms, such as electronic mail and other communication protocols, or simply carried to the computer system 10 by way of physical storage media.

The computer system 10 may further include at least one processor, program storage, such as memory, for storing program code executable on the processor, and for storing data accessible by such program code, as well as one or more input/output devices and/or interfaces, such as data communication and/or peripheral devices and/or interfaces to secondary storage devices also for storing data. The computer system 10 may further include any appropriate type of operating system software, as well as other types of application program software, such as an electronic mail client program and/or other communication application software.

As further shown in FIG. 1, the ECU 48 includes a Web Server 51, as well as configuration data 52, ECU software image 53, and processors and other ECU hardware 55. The ECU 48 controls a number of living environment devices 50 located in the home living environment 49, such as a television 50*a*, lights 50*b*, telephone 50*c*, and other devices 50*d*. The configuration data 52 includes user characteristics 52*a* and living environment characteristics 52*b*.

The user characteristics 52*a* include user specific ECU configuration data used by an ECU to recognize and process commands received from a disabled person that uses the ECU 48 to control the devices 50, and to provide information to such a user. The user characteristics stored in a given ECU make up an ECU user profile that depends in part on, and accordingly reflects, the type and/or extent of disability of the current user for that ECU. A user profile stored in an ECU, such as a user profile consisting of the user characteristics 52*a*, may be independently uploaded into, and/or downloaded from the database 16.

For example, for a voice enabled user, the user characteristics 52*a* may include user specific voice recognition data. Such user specific voice recognition data may include recorded input words, which are input by the user when training the system to recognize commands spoken in the user's voice. These input words may be considered voice or speech templates associated with the user. The user characteristics 52*a* may further include recorded or synthesized output words to be spoken or otherwise output by the ECU in response to a signal or request from the ECU user. Such output words may correspond to items of a menu output to the user. During a process in which the user is allowed to indicate or select a desired menu item from among the output menu items, such words may be output by digital to analog conversion hardware and a speaker contained in the ECU, and the user can indicate the desired menu item by providing an indication, for example by operating a switch, after the desired menu item is output by the ECU. Various menus are provided during operation of the disclosed system, including menus having items allowing a user to select from among multiple living environment devices to be controlled, or from among features or commands associated with multiple or individual living environment devices.

Voice recognition data is an example of a user characteristic appropriate for a disabled person that is able to use their voice to issue spoken commands to an ECU. In the case of a disabled user that cannot use their voice to issue voice commands to the ECU, the appropriate user characteristics 52*a* might alternatively include other information relative to receiving and processing non-verbal user commands by the ECU 48. Non-verbal user commands may be provided to the ECU through a variety of appropriate user input devices. For example, non-verbal users, such as users that may be attached to a ventilator, or who for some other reason cannot verbalize commands to the ECU, may wish to control a relatively smaller number of living environment devices, and can accordingly configure the ECU such that they only need to select from a relatively small set of living environment devices. The user characteristics 52*a* accordingly may contain indication of a specific subset of controllable living environment devices for a given living environment that are to be controlled through the ECU for an associated user, thus reflecting the specific disability of that user. The ECU may be configured with a living environment profile indicating the complete set of living environment devices in the associated living environment, and also with a user profile indicating the subset of those potentially controllable living environment devices that are to actually be controlled by the ECU for a specific user.

The user characteristics 52*a* may further reflect a user's disability by defining parameters describing how input from a specific input device is to be processed or interpreted. For example, such a user characteristic might reflect the user's disability in terms of a switch speed characteristic, which defines a period of time for which the ECU will block out inputs received from a user interface switch device after an initial input is received from the device. Such a switch speed characteristic is advantageous for a disabled user that may be subject to shaking or spasticity, which might cause them to continue pressing a switch after they initially press it, or to press it repeatedly when they only intend to press it once. The time period during which subsequent switch input is blocked after an initial event is referred to herein as the "switch speed" defined for that user.

Additionally, the disclosed system can provide user characteristics that reflect the user's disability in terms of a menu speed at which menu items for a device are read out or visually displayed to the user through either a speaker contained within the ECU, or through a visual display screen attached to the ECU.

Other examples of user characteristics that may reflect the user's disability or preferences include menu item order, and voice activated telephone speed dial commands that trigger dialing of certain stored telephone numbers.

The living environment characteristics 52b include living environment specific data used by the ECU 48 to control individual ones of the controlled devices 50. The living environment characteristics stored in a given ECU make up a living environment profile that depends in part on, and accordingly reflects, the specific devices located within the living environment in which the ECU is used, and that are controlled through the ECU. A living environment profile stored in an ECU, such as the living environment characteristics 52b, may be independently uploaded into, and/or downloaded from the database 16.

For example, living environment characteristics 52b might include remote control information, such as infrared codes or the like, that are generated by the ECU 48, in response to voice or other commands received from the disabled user, and that control one or more of the controlled devices 50 located in the home living environment 49. Codes stored as living environment characteristics, and associated with living environment devices, may further include codes identifying specific devices within a given communication network or communication protocol. For example, the living environment characteristics may include codes that identify and control certain corresponding living environment devices based on the X10 power line communication standard, or based on some other standard or proprietary communication and/or device control protocol. User characteristics for the ECU may further include specific user generated commands, such as voice commands consisting of input words trained by an associated user, and such user specific commands and device specific codes are associated together by the ECU software to allow the user to use their own custom commands to control features of the living environment devices within the living environment defined by the living environment profile.

The ECU software image 53 consists of software or firmware executing on the processors and other ECU hardware 55. For example, the ECU software image 53 may be embodied using code that is loadable onto a field programmable gate array (FPGA). In such an embodiment, the FPGA for the ECU 48 may be programmed with the ECU software image 53 out of a memory within the ECU 48 by a processor in the processors and other ECU hardware 55 at power up of the ECU 48.

With regard to the ECU 38a, it similarly includes a Web Server 41, as well as configuration data 42, ECU software image 43, and processors and other ECU hardware 55. The ECU 38a controls a number of controlled devices 40 located in the living environment A 39a, which may be one of many such living environments located within a hospital or assisted living facility. The controlled devices 40 may, for example, include a television 40a, lights 40b, telephone 40c, and other devices 40d. The configuration data 42 includes user characteristics 42a and living environment characteristics 42b.

As with user characteristics 52a, user characteristics 42a consist of user specific data used to recognize and process commands received from a disabled person that uses the ECU 38a to control the controlled devices 40. The living environment characteristics 42b consist of living environment specific data used by the ECU 38a to control individual ones of the controlled devices 40. The ECU software image 43 consists of software or firmware executing on the processors and other ECU hardware 55, and may similarly be embodied using a field programmable gate array (FPGA) that is programmed out of a memory within the ECU 38a with the ECU software image 43 by a processor in the processors and other ECU hardware 45 at power up of the ECU 38a.

Both the ECU 48 and ECUs 38 may include or be attached to various specific input devices to receive commands from users. Such input devices may include voice recognition hardware and software, interfaces to pressure plates, sip and puff devices, and others. Similarly, the ECU 48 and ECUs 38 may include or be attached to various specific output devices used to output commands or control signals to living environment devices under their control. Such output devices may include infrared and other types of transmitters, communication interfaces for providing commands over communication networks operating over dedicated communication lines, power lines, wireless communication network interfaces, speakers, digital to analog converters, lights and LEDS, and others.

During operation of the components shown in FIG. 1, an administrator user 20 issues commands through the administrator user interface 18 to cause the software tool 12 to move user profiles, and potentially also living environment profiles, between ECUs 48 and 38a and the database 16. In one embodiment, the software tool 12 causes user profiles and living environment profiles to be moved between the computer system 10 and the ECUs 38 and 48 using the HTTP protocol. Alternatively, other appropriate communication protocols may be used for this purpose.

For example, if a disabled user "John Smith" that is living in the home living environment 49 were to need to visit a hospital that includes the living environment A 39A, it would be desirable to move the user characteristics associated with John Smith, and currently programmed into the ECU 48, into the ECU 38a. To address such a situation, the administrator user 20 may issue commands through the administrator user interface 18 to cause the tool 12 to upload the user characteristics 52a from the ECU 48 into the database 16. The tool 12 operates under control of the administrator user 20 to associate the uploaded user characteristics 52a with a unique identifier, such as the name John Smith. The tool 12 is further operable to subsequently retrieve uploaded user characteristics 52a based on a query containing the name "John Smith", and then download those user characteristics into the ECU 38a. The user John Smith can then travel from his home living environment 49 to the living environment A 39a, and immediately begin using the ECU 38a to control the controlled devices 40 without having to retrain the ECU 38a with his specific user characteristics, and without having to move either the ECU 48 or the controlled devices 50 to the living environment 39a.

Further during operation of the components shown in FIG. 1, an administrator user 20 issues commands through the administrator user interface 18 to cause the tool 12 to move living environment profiles between ECUs 48 and 38a and the database 16. For example, if a hospital were to purchase multiple ECUs for use in a number of substantially similar living environments, such as living environments surrounding beds located in rooms within the hospital, embodiments of the tool 12 can be used to efficiently program all the new ECUs. In one embodiment, the administrator user 20 issues commands to the tool 12 that cause the tool 12 to program the living environment profile of one of the new ECUs, and then to copy the living environment profile of that ECU to all the remaining ECUs. For example, the administrator user 20 may issue commands through the user interface 18 to cause the tool 12 to program the living environment characteristics of one of the ECUs 38, such as ECU 38a, and to then upload such characteristics into a resulting living environment profile stored in the database 16. The tool 12 may further be used to associate a unique name with the new living environment profile that can then be used to retrieve it from the database 16. Such a unique name may conveniently include or consist of a descriptive name for the rooms or beds in which the group of ECUs are to be located, such as "Environment Profile for South Wing Rooms". The administrator user 20 can then use the tool 12 to download the "Environment Profile for South Wing Rooms" into the other ones of the newly purchased ECUs. A patient moving to or visiting the South Wing of the facility can download their personal user profile into the ECU for the room in which they will stay, and then immediately begin to use the ECU to control the devices in that room.

The disclosed system may further be embodied to allow an administrator user 20 to upgrade the ECU software image of one or more ECUs using selected ones of the ECU software images 15 stored on the administrator user computer system 10. Such upgrades may, for example, be accomplished in response to commands issued through the user interface 18 which cause the tool 12 to use the FTP (File Transfer Protocol) protocol to convey a selected one of the ECU software images 15 to a selected ECU.

In another embodiment of the disclosed system, the user characteristics and/or living environment characteristics of an ECU can be periodically backed up to the database 16. This feature prevents loss of configuration information, which may be time consuming to re-enter, in the event of an individual ECU failure.

The ECU administration tool 12 is further operable to configure the user characteristics and/or living environment characteristics contained within either the ECU 48 or ECUs 38 through the Web server programs contained within the respective ECUs. To obtain configuration data from a selected ECU, a client software program, such as the ECU administrator tool 12 or a separate browser program issues configuration data requests from the administrator user computer system 10 to the Web server of the selected ECU using HTTP. The Web server program in the ECU issues HTTP responses to the requesting client program that include HTML documents containing the requested configuration data. The requesting program then renders the HTML such that the requested configuration data is presented to the administrator user 20 through the interface 18. Similarly, the administrator user 20 can issue commands through the interface 18 that cause the tool 12 to modify or set values of the configuration data stored in a selected ECU by issuing HTTP commands that are processed by the receiving Web server program in the selected ECU.

In this way, when the living environment and user profile data is stored in an ECU, HTML in the ECUs allows access to the various other types of profile data by way of the Web server within the ECU. The responses provided from the Web server in the ECU may, for example, include HTML and Java script for processing on the administrator computer system, with the Java script sent by the ECU being interpreted on the requesting system to help move configuration characteristics between the administrator computer system and the ECU.

Figure 2:
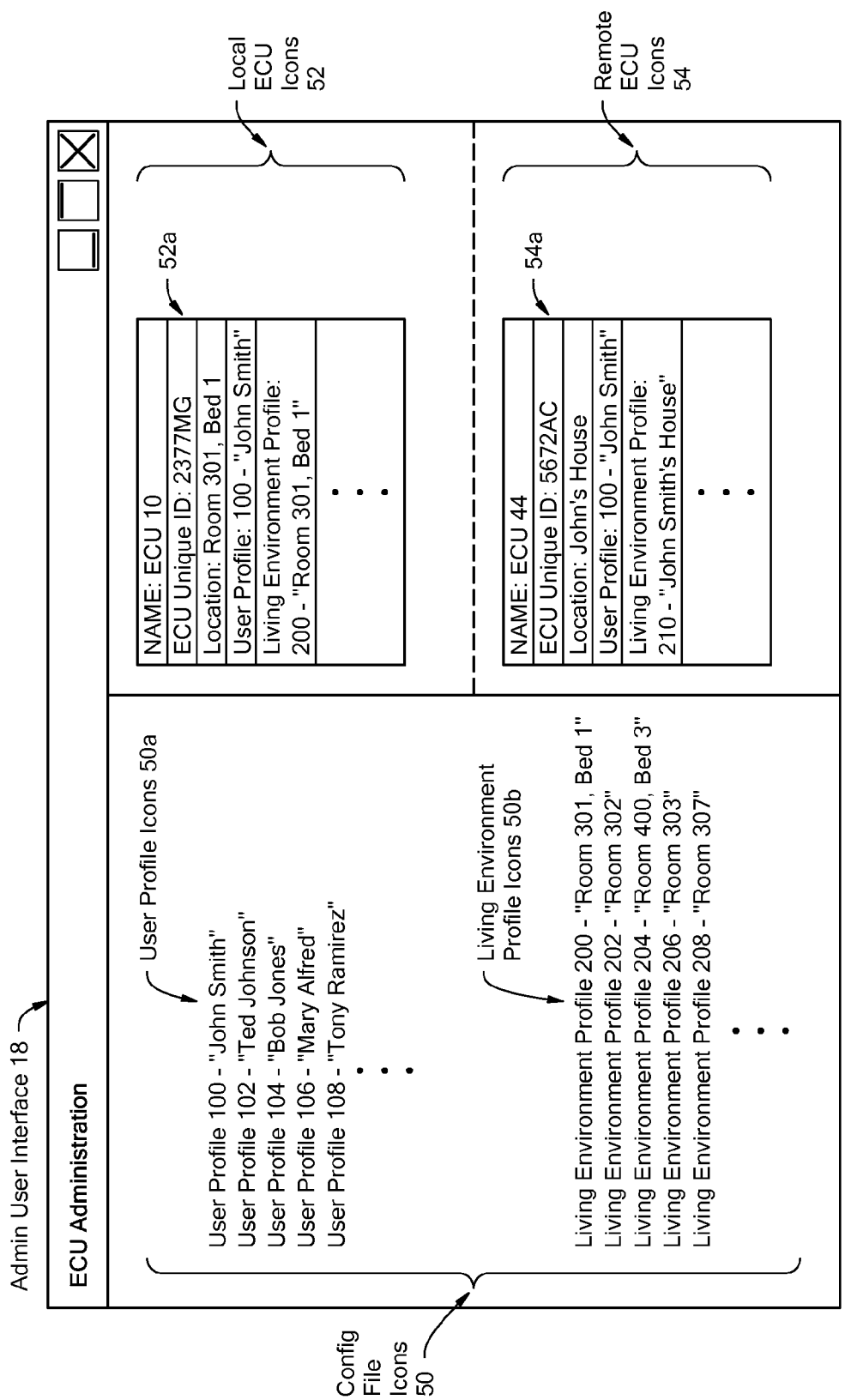
FIG. 2 is a simplified screen shot of a user interface provided to an administrator user in an illustrative embodiment of the disclosed system.

FIG. 2 is a simplified screen shot provided to an administrator user by an embodiment of the disclosed system in the user interface 18, and enabling the administrator user to select and move user profiles and living environment profiles between ECUs and the ECU configuration profile database 16 (FIG. 1). As shown in FIG. 2, a number of configuration file icons 50 includes user profile icons 50a and living environment profile icons 50b. In the example of FIG. 2, the user profile icons 50a are shown as lists of entries, where each entry includes a profile number ("100", "102", etc.) and a user's name ("John Smith", "Ted Johnson", etc.). Similarly, the living environment profile icons are shown as lists of entries, where each entry includes a profile number ("200", "202", etc.) and a name of a living environment ("Room 301, Bed 1", "Room 302", etc.). The user profile icons 50a correspond to respective ones of the user profiles stored in the ECU configuration profile database 16, and the living environment profile icons 50b correspond to respective ones of the living environment profiles stored in the ECU configuration profile database 16.

Also shown in FIG. 2 are a number of local ECU icons 52, shown for purposes of illustration by ECU 52a, corresponding to ECUs that are local to a hospital or other institution, such that, for example they are connected to one or more local networks under the control of that institution. Similarly, a number of remote ECU icons 54, shown for purposes of illustration by ECU 54a, correspond to ECUs that are located remotely with respect to the institution, but that are accessible through the Internet. The icons 52 and 54 are shown visually providing information including an ECU name, Unique ID, Location, current User Profile, and current Living Environment profile. However, any specific information relating to an associated ECU may be provided through each of the icons 52 and 54. Alternatively, some or all of the information regarding an associated ECU and shown in the illustrative icons 52 and 54 of FIG. 2 may be provided as part of a hover-over display displayed when the user hovers the cursor over the icon, or as part of a set of properties made accessible when the user right clicks on the icon, or in some other specific way. Moreover, those skilled in the art will recognize that the specific visual representations of the icons 50, 52 and 54 are provided only for purposes of convenient illustration and explanation, and that the present invention is not limited to these specific visual representations. Instead, the present invention may be embodied using any specific visual representation to provide the icons 50, 52 and 54 of FIG. 2.

During operation of the embodiment shown in FIG. 2, the user can select one of the user profile icons 50a to perform an action on or involving the corresponding user profile, can select one of the living environment profile icons 50b to perform an action on or involving the corresponding living environment profile, can select one of the local ECU icons 52 to perform an action on or involving the corresponding local ECU, and/or can select one of the remote ECU icons 54 to perform an action on or involving the corresponding remote ECU. Such user selection may, for example, be detected by the disclosed system when the user uses the mouse to click on the icon to be selected. For example, in order to move one of the user profiles corresponding to one of the user profile icons 50 to one of the local ECUs corresponding to one of the local ECU icons 52, the user can click on the user profile icon, drag it over the local ECU icon and, drop the user profile icon onto the ECU icon. Similarly, the user can double click on one of the configuration file icons 50 to read and/or modify the contents of the corresponding user or living environment profile. The user can further double click on one of the local ECU icons 52 or remote ECU icons 54 to read information, including current user and living environment profile characteristics, and other information, from within the corresponding ECU. Moreover, double clicking on one of the local ECU icons 52 or remote ECU icons 54 enables the user to extract the user profile and/or living environment profile information from the corresponding ECU and store that information in the ECU configuration profile database (FIG. 1).

While in FIG. 2 the user interface 18 enables an administrator user to move and/or modify user profiles and living environment profiles by dragging and dropping associated icons, and/or by double clicking or right-clicking on associated icons, the disclosed system is not so limited. Accordingly, those skilled in the art will recognize that other graphical user interface mechanisms, such as buttons, pull down menus, and others, may be used alternatively or in addition to provide the administrator user with the ability to move and/or modify user profiles and living environment profiles through the user interface 18. Moreover, while in the example of FIG. 2 the configuration icons 50, local ECU icons 52 and remote ECU icons 54 are displayed and accessible within the user interface 18, the disclosed system may alternatively be embodied such that the administrator user is provided with a search interface that accepts a search query input string, and that returns matching user profiles, living environment profiles, local ECUs, and/or remote ECUs by displaying the corresponding icons.

Figure 3:
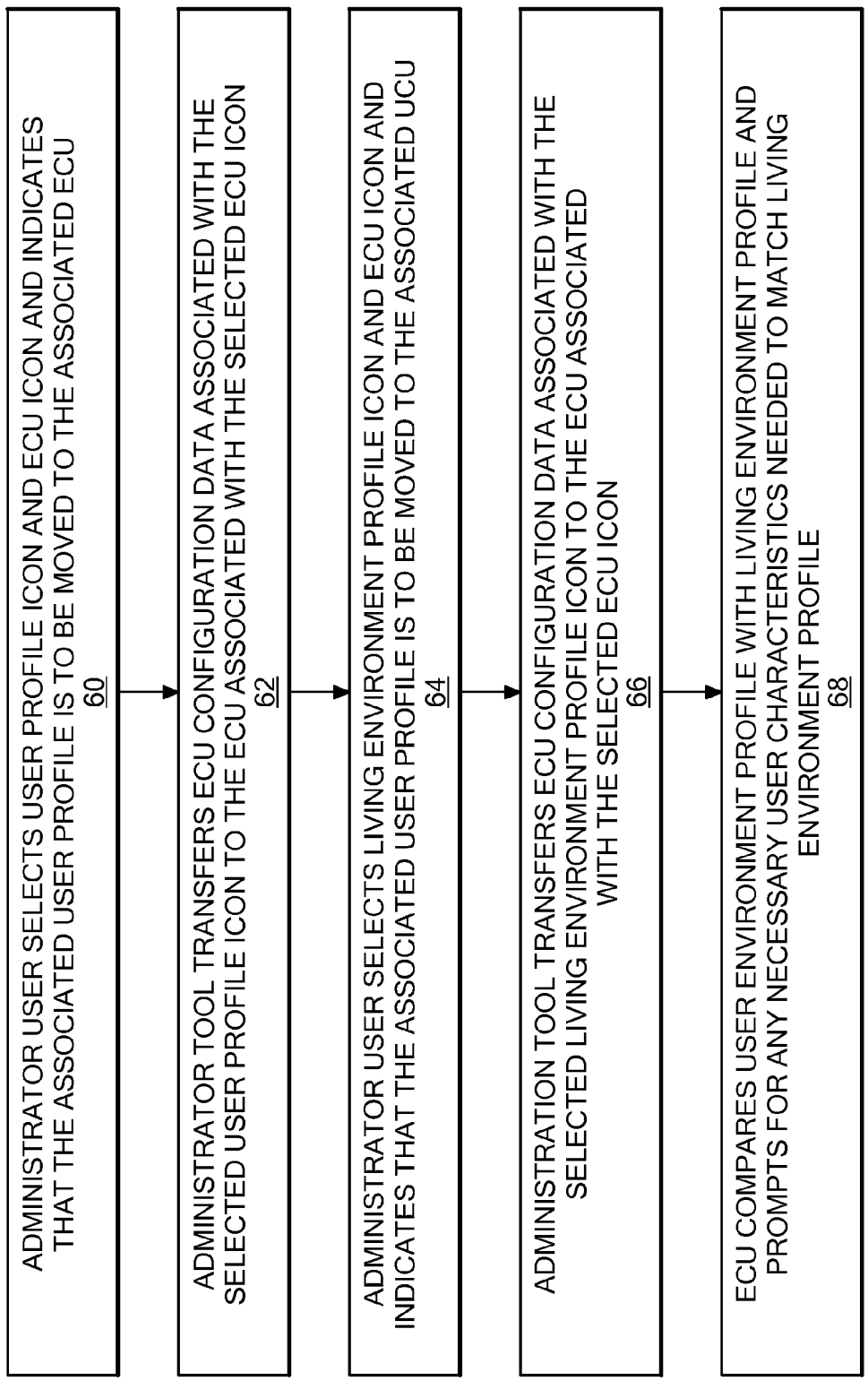
FIG. 3 is a flow chart showing steps performed in an illustrative embodiment of the disclosed system to download user and living environment configuration profiles from a configuration profile database into one or more environmental control units (ECUs)

FIG. 3 is a flow chart illustrating steps performed in an illustrative embodiment to download configuration information from a configuration profile database into one or more environmental control units (ECUs). As shown in FIG. 3, at step 60 the administrator user selects a user profile icon and an ECU icon, and indicates that the associated user profile is to be moved to the associated ECU, for example by dragging the user profile icon over the ECU icon and dropping the user profile icon on top of the ECU icon. At step 62 the administration tool software operates to transfer the configuration data in the user profile associated with the selected user profile icon to the ECU associated with the selected ECU icon, for example using the HTTP protocol. At step 64 the administrator user selects a living environment profile icon and an ECU icon, and indicates that the associated living environment profile is to be moved to the associated ECU, for example by dragging the living environment profile icon over the ECU icon and dropping the living environment profile icon on top of the ECU icon. At step 62 the administration tool software operates to transfer the configuration data in the living environment profile associated with the selected user profile icon to the ECU associated with the selected ECU icon, for example using the HTTP protocol.

At step 68, the ECU to which the configuration data was transferred in steps 60-66 compares the downloaded user environment profile with the downloaded living environment profile and prompts the user for any necessary user characteristics needed to match the living environment profile. For example, if the living environment profile downloaded at step 66 includes characteristics associated with a microwave oven, but the user profile downloaded at step 62 does not include a word input or inputs that the user can speak to control the microwave oven, then at step 68 the ECU would prompt the user to provide such word inputs so that the microwave oven can be controlled through the ECU.

Figure 4:
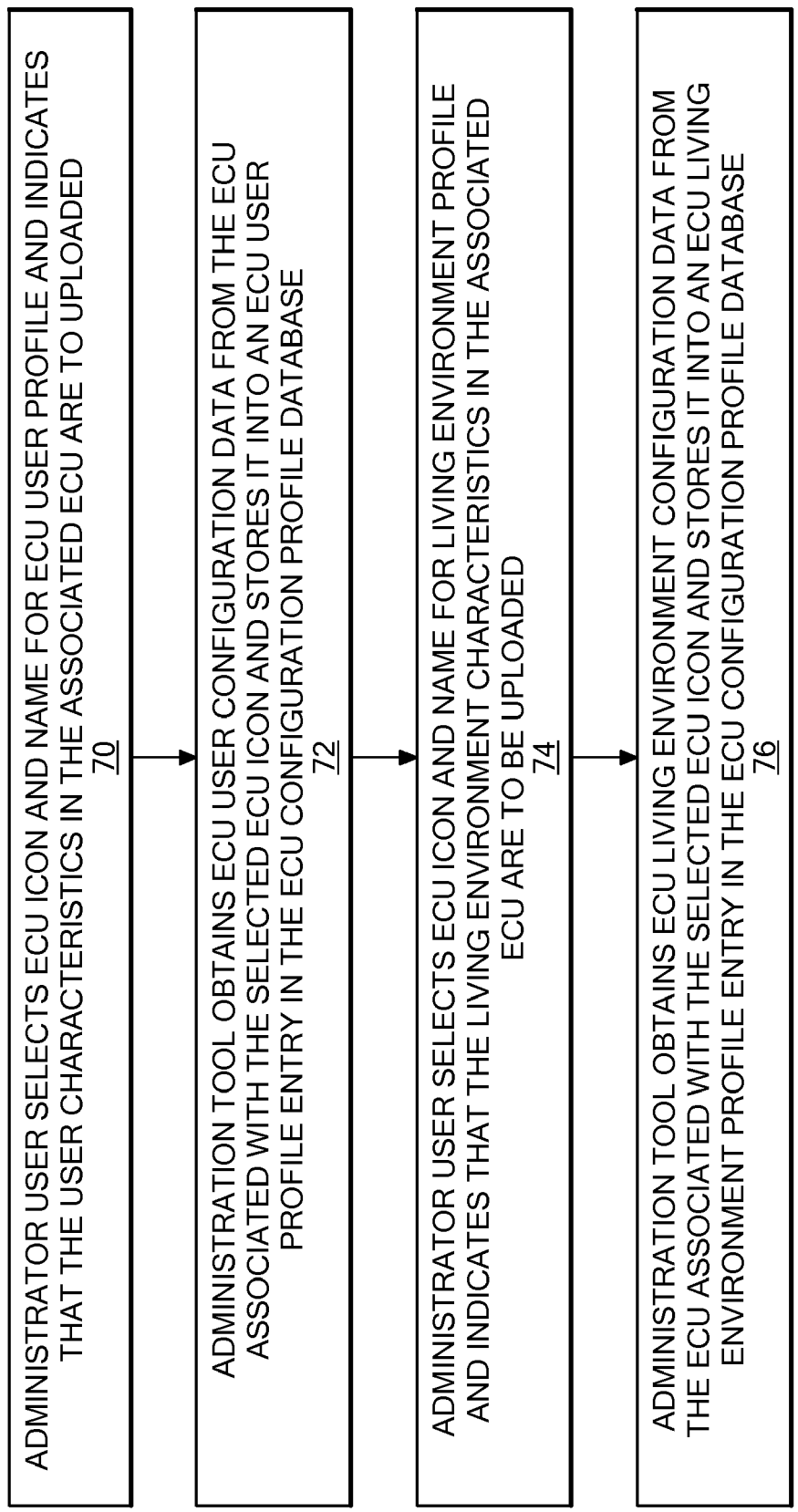
FIG. 4 is a flow chart illustrating steps performed in an illustrative embodiment of the disclosed system to upload user and living environment configuration information from an ECU to user and living environment profiles contained in a configuration profile database.

FIG. 4 is a flow chart illustrating steps performed in an illustrative embodiment to upload configuration information from an ECU to a configuration profile database. As shown in FIG. 4, at step 70 the administration tool detects that an administrator user has selected an ECU icon, indicated that the user characteristics in the associated ECU are to be uploaded into a user profile, and indicated a name for the user profile. At step 72 the administration tool obtains the ECU user configuration data from the ECU associated with the selected ECU icon, and stores the user configuration data into a user profile entry in the ECU configuration profile database. At step 74 the administration tool detects that an administrator user has selected an ECU icon, indicated that the living environment characteristics in the associated ECU are to be uploaded into a living environment profile, and indicated a name for the living environment profile. At step 76 the administration tool obtains the ECU living environment configuration data from the ECU associated with the selected ECU icon, and stores the living environment configuration data into a living environment profile entry in the ECU configuration profile database.

Figure 5:
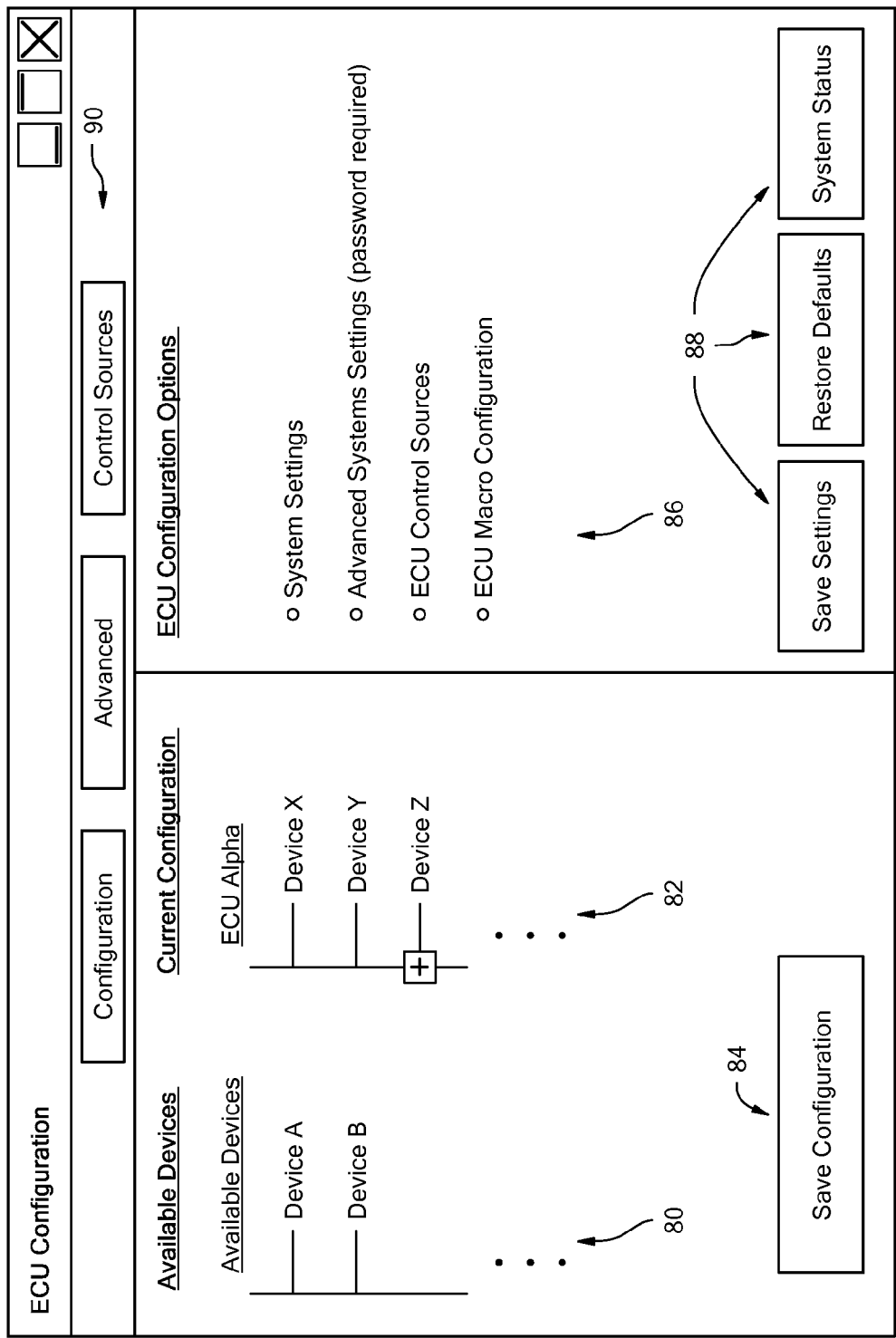
FIG. 5 is a simplified screen shot showing a portion of a user interface provided by an embodiment of the disclosed system to enable a user to configure an ECU with regard to the devices the ECU controls.

FIG. 5 is a simplified screen shot showing a portion of a user interface 18 provided by an embodiment of the disclosed system to enable a user to configure a previously selected ECU with regard to the living environment devices that an ECU controls. In the example of FIG. 5, the previously selected ECU is ECU Alpha, which may have been previously selected through a user interface such as that shown in FIG. 2, for example by double clicking on one of the ECU icons 52 or 54, or through some other mechanism. As shown in FIG. 5, a list 80 of available devices for ECU Alpha includes Device A, Device B, etc. A current configuration 82 of ECU Alpha is shown including Device X, Device Y, Device Z etc. In the illustrative embodiment, when a user selects an ECU through the tool 12 for configuration in the ECU Administration screen of FIG. 5, the tool 12 extracts information from the selected ECU for the available devices list 80, the current configuration 82, and to support the ECU configuration options 86. FIG. 5 also includes control buttons 90 providing access to other configuration interfaces, a save configuration button 84, that allows the user to save modifications made to the current configuration list 82, and control buttons 88 that provide control over modifications to settings and other parameters available through the ECU configuration options 86, and access to system status.

The available devices list 80 contains clickable icons representing living environment devices that can be supported by the selected ECU, and that may be added to the current configuration 82. For example, the living environment devices represented in the list 80 may be a number of living environment devices for which the selected ECU currently has appropriate hardware, software or firmware contained within it. The current configuration 82 is based on one of more living environment characteristics within a living environment profile stored in ECU Alpha. The ECU refers to the list of living environment devices in the current configuration 82 to determine any set up or configuration operations that must be performed to allow a user to control the devices in the list. For example, the ECU would check to see whether the current user profile loaded into the ECU indicates voice commands and/or other user characteristics that can be used to control each of the devices in the current configuration 82. If not, then the ECU might prompt the user or otherwise indicate that such user characteristics are needed to control one or more of the devices in the current configuration 82.

Figure 6:
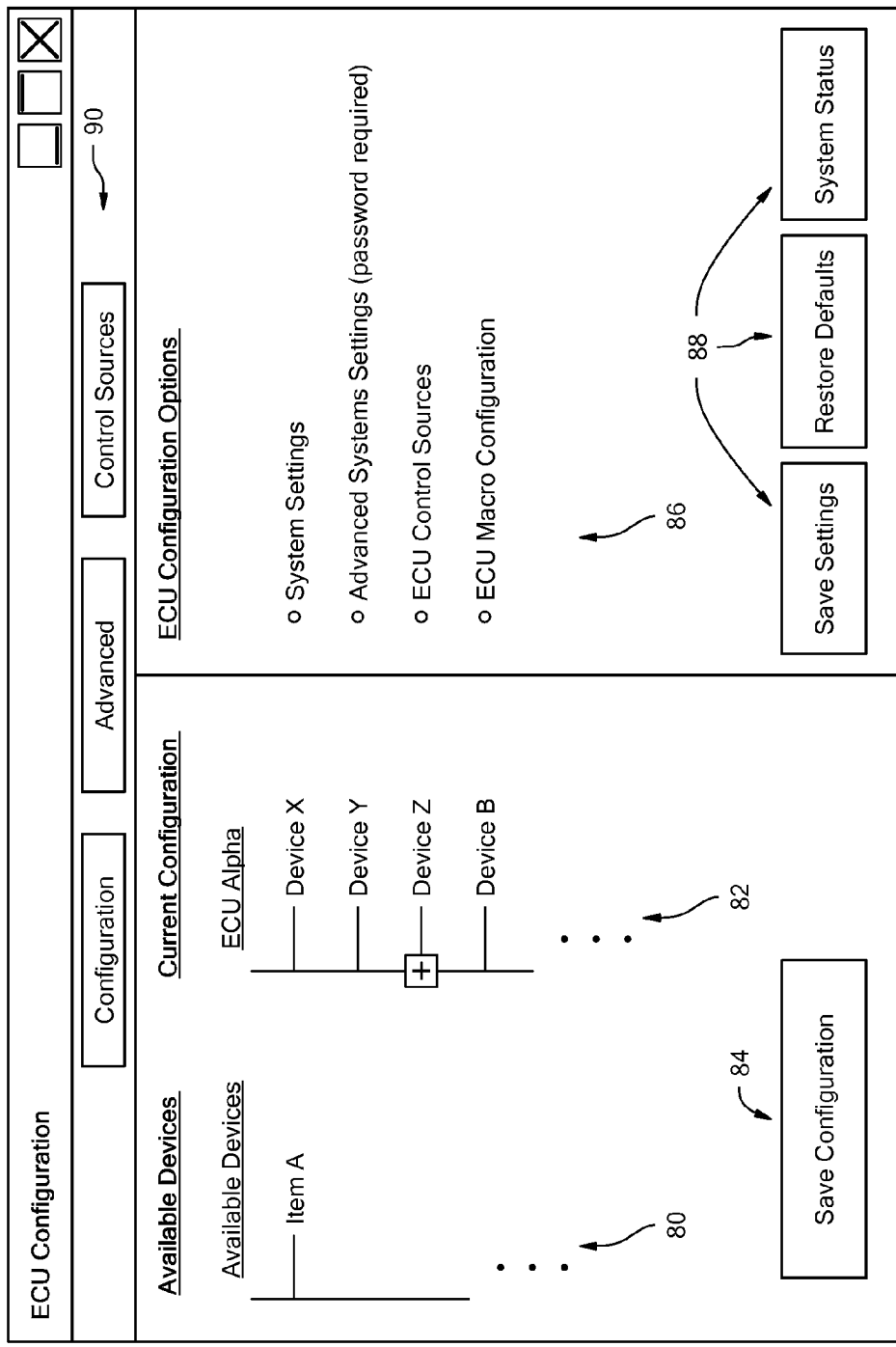
FIG. 6 is a simplified screen shot showing the portion of the user interface of FIG. 5 after a user has indicated a new device that is to be controlled by an ECU.

In order to add a device contained in the available items list 80 to the current configuration 82, the user can click on that the icon for the device in the list 80 and drag it over the current configuration list 82, and then drop the icon onto the current configuration list 82. This provides the user with a "drag and drop" interface through which they can move available living environment devices into the current configuration for the selected ECU. To illustrate such an operation, FIG. 6 shows the portion of the user interface of FIG. 5 after a user has indicated a new device that is to be controlled by the ECU, and accordingly added to the current configuration 82. As shown in FIG. 6, the user has dragged the icon for device B from the available items list 80 into the current configuration list 82. As a result, the selected ECU (ECU Alpha) will perform a check to determine whether all user characteristics that are needed to control device B are currently loaded. If any such user characteristics are not loaded, the ECU will inform the user that such characteristics are missing and/or needed.

Figure 7:
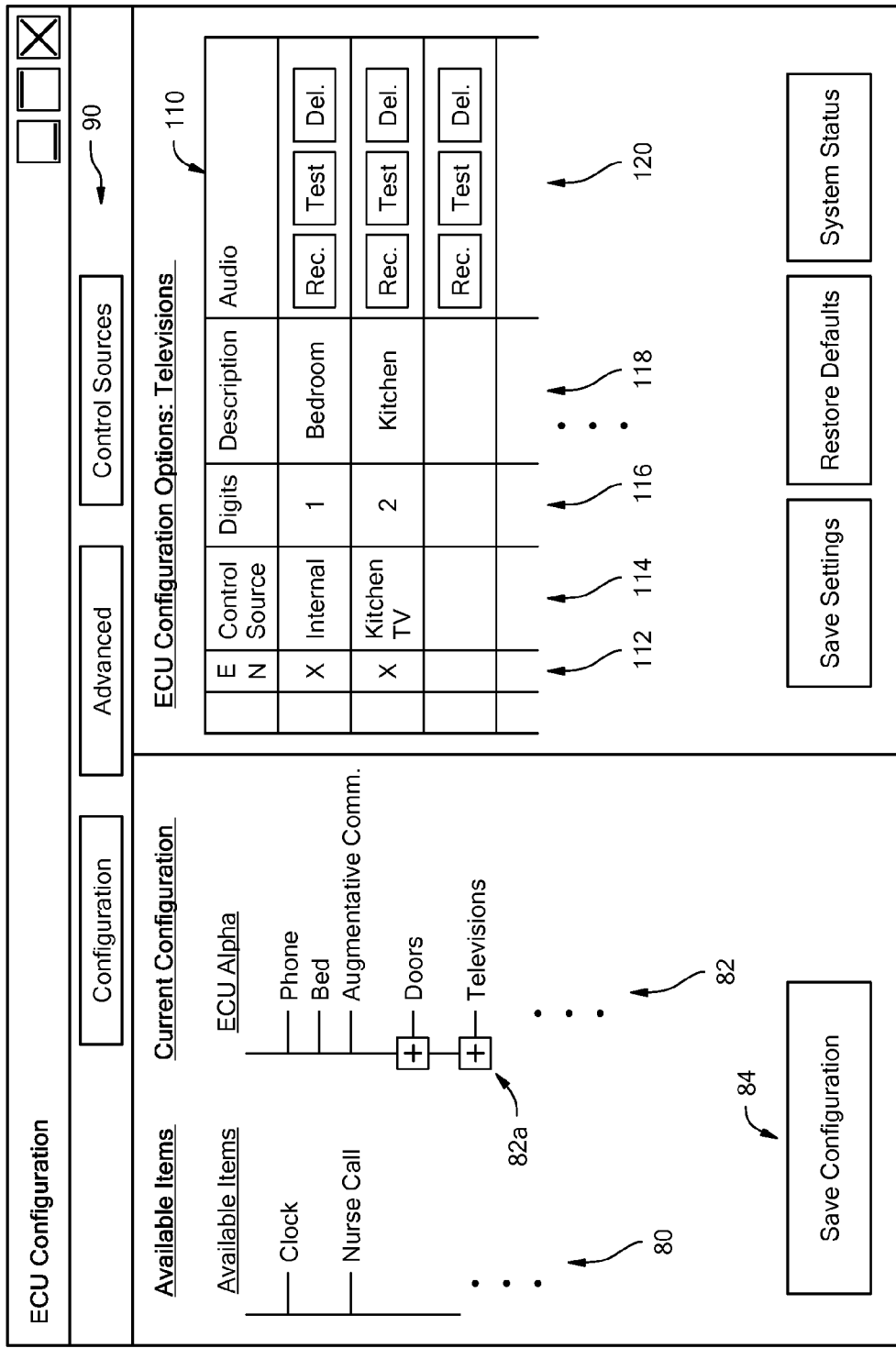
FIG. 7 is a simplified screen shot showing a portion of a user interface provided by an embodiment of the disclosed system to enable a user to enter living environment and user characteristics for a number of controlled devices.

FIG. 7 is a simplified screen shot showing a portion of a user interface provided by an embodiment of the disclosed system that enables a user to enter living environment and user profile characteristics for a number of controlled devices. As shown in FIG. 7, a configuration option table 110 is displayed in response to the user selecting the "Televisions" icon 82a in the current configuration list 82. The table 110 includes a number of rows, each of which corresponds to a television that can be controlled by ECU Alpha.

A column 112 in the table 110 indicates the specific televisions that are enabled and that will be controlled by the ECU Alpha. The enabled televisions or other devices for an ECU may be indicated by one or more living environment profile characteristics, The interface shown in FIG. 7 also allows a user to set the living environment profile characteristic(s) indicating which televisions are enabled for control by the ECU, for example by clicking on or entering an "X" into the column 112 for each television that is to be enabled.

A column 114 in the table 110 indicates and provides access to the number of digits associated with a given controlled television. The column 14 is an example of a living environment device specific characteristic that is passed to the ECU, and that enables the disabled user to operate the living environment device through the ECU. The number of digits associated with a given controlled television reflects the number of digits required to send a command to that specific television from the ECU. For example, if the number of digits used to control a television is set to 3, the ECU will wait for the user to enter or otherwise indicate three digits before it puts the digits together or otherwise generates a corresponding command to be passed to that television. This feature of the disclosed system is significant for disabled users who may take relatively long periods of time between entering digits to be used in a command, since the command will not be generated by the ECU until all the necessary digits have been entered or indicated by the user. In this way, the ECU is told to wait until the total number of required digits is entered that are required for a command to be sent to a controlled device.

The name in column 118 provide allows a descriptive name to be associated with a corresponding living environment device, in this case a controlled television. The record, test and delete buttons contained in column 120 provide the user with the ability to record, test and delete an audio command that can later be used to indicate to the ECU that the corresponding television is to be selected. The information accessed through columns 114 and 118 consists of one or more living environment profile characteristics, while the information accessed through the column 120 consists of one or more user profile characteristics.

Figure 8:
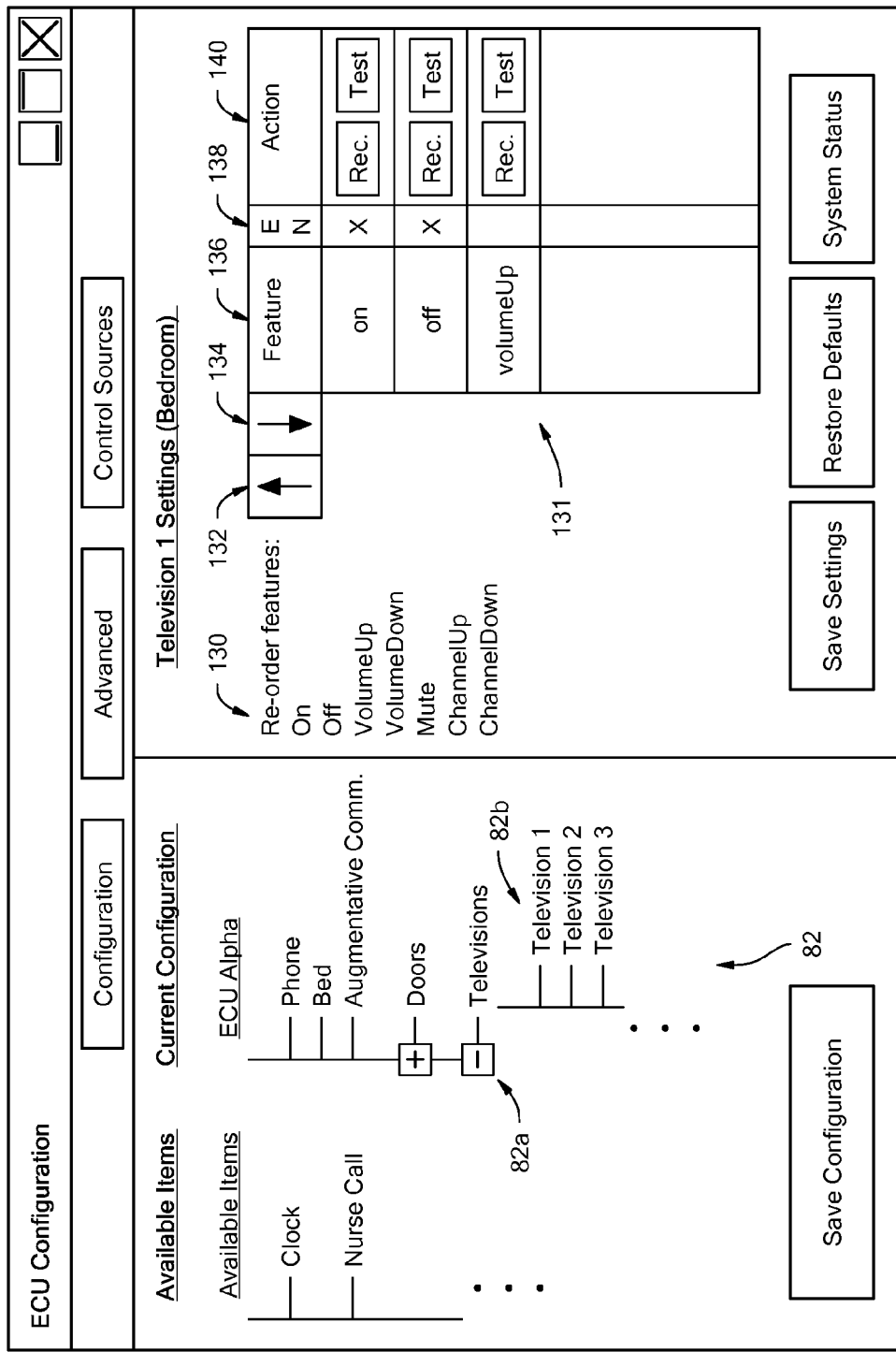
FIG. 8 is a simplified screen shot showing a portion of a user interface provided by an embodiment of the disclosed system to enable a user to enter living environment and user characteristics for a specific controlled device.

FIG. 8 is a simplified screen shot showing a portion of a user interface provided by an embodiment of the disclosed system that enables a user to enter living environment and user profile characteristics for a specific controlled device. The user interface of FIG. 8 is provided in response to the user clicking on or otherwise selecting the "Television 1" icon 82b. As shown in FIG. 8, a number of controlled features associated with "Television 1" are shown in a list 130, and a first control 132 is provided so the user can move a selected feature upwards in the list 130, while a second control 134 is provided so the user can move a selected feature downwards in the list 130. The order of the features in the list 130 is the order that the features are presented to the user. For example, in the case where a user is non-verbal and interfaces the ECU through a switch, the user selects a feature in the list 130 by depressing or otherwise closing the switch after the desired feature is spoken by the ECU. The order of the features in the list 130 therefore defines the order in which those features are "scanned" by the ECU for presentation to the user. A user may desire to re-order the features in the list to meet the user's specific preferences with regard to which features are listed before other features. Accordingly, the order of the features in the list 130 is a user profile characteristic. The user can modify the order of the list 130 by selecting one of the features in the list, for example by clicking on that feature using the mouse, and then clicking on the button 132 to move the feature up in the list, or clicking on the button 134 to move the feature down in the list.

Each row in the table 131 corresponds to a feature for Television 1, and the column 136 provides indication of and access to the names of each feature. The column 138 provides indication of and access to whether a feature is enabled. The features listed in column 136 are living environment characteristics, while a user characteristic may be used to control whether specific features are enabled, as indicated by column 138. By enabling and disabling certain features for a living environment device, a user can winnow down the set of features in the list 130 to meet their specific needs.

The record and test buttons in column 140 provide access to one or more living environment characteristics that define how a corresponding feature is controlled by the ECU. For example, in the case where a living environment device such as Television 1 is controlled through infrared remote control signals generated by the ECU, then the user can record a signal for a feature by clicking on the record button in column 140. The user can then test whether the recorded signal performs the desired operation by clicking on the test button in column 140. Living environment devices may be controlled by a wide variety of actions, and alternative actions that may be accessed for other devices through a column 140 provided for such devices include X10 network codes or device addresses, and/or other types of network addresses and/or codes to be sent to the controlled device. For such devices, the column 140 would include a text entry portion, menu, or some other user interface mechanism for entering such control actions.

Figure 9:
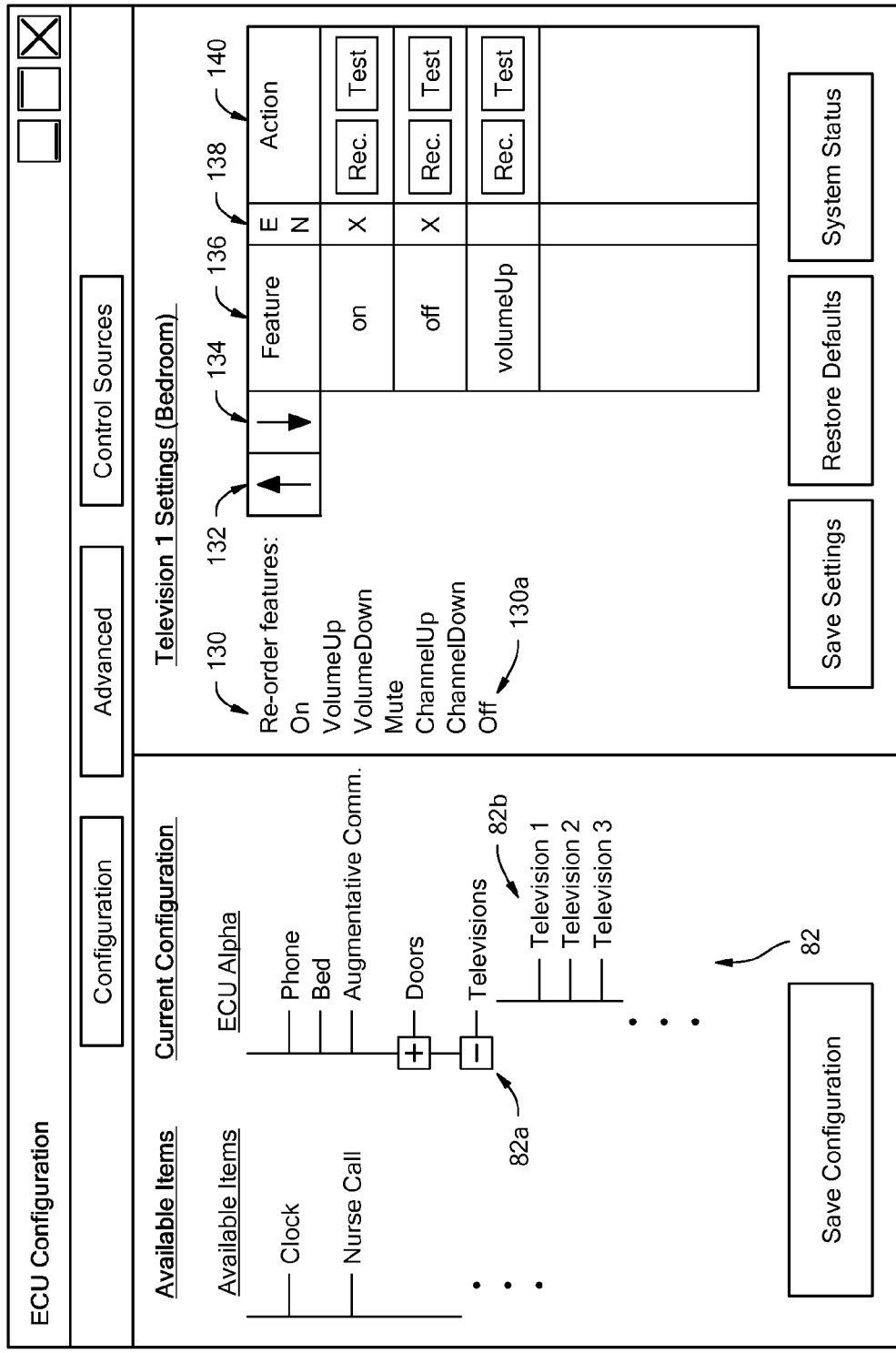
FIG. 9 shows the portion of the user interface of FIG. 8 after a user has modified a user characteristic that defines an ordering of features or commands associated with a controlled device.

FIG. 9 shows the portion of the user interface of FIG. 8 after a user has modified the user profile characteristic determining the order of features associated with a controlled device. As shown in FIG. 9, the "Off" feature 130a has been moved to the bottom of the list 130.

Figure 10:
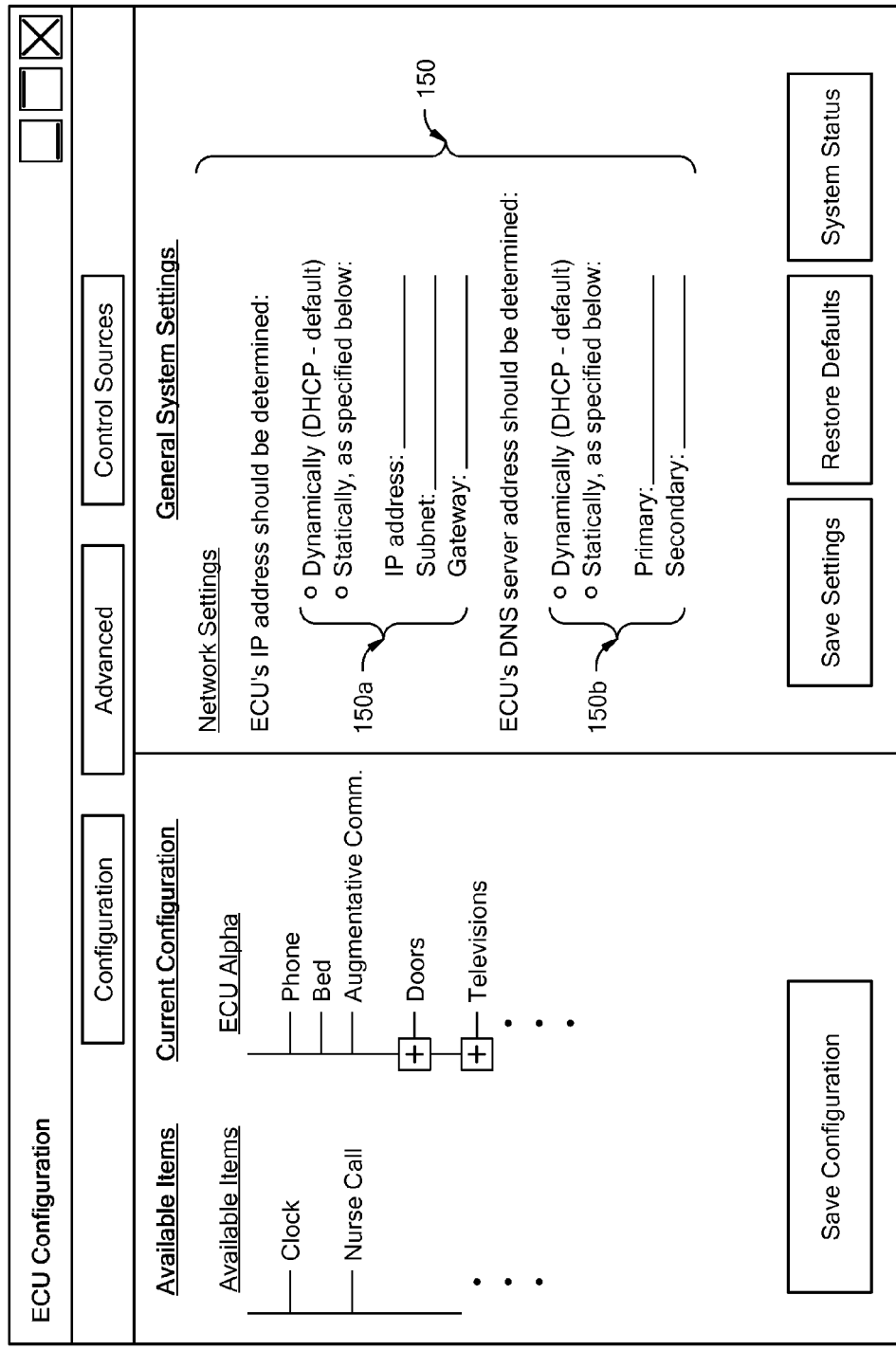
FIG. 10 is a simplified screen shot showing a portion of a user interface provided by an embodiment of the disclosed system to enable a user to enter living environment configuration characteristics for one or more ECUs.

FIG. 10 is a simplified screen shot showing a portion of a user interface provided by an embodiment of the disclosed system to enable a user to enter living environment characteristics for one or more ECUs. As shown in FIG. 10, the network settings 150 for an ECU may be controlled through a number of IP address settings 150a and DNS server address settings 150b. The settings 150a enable a user to indicate whether the IP address for the ECU is to be dynamically or statically determined. In the case where the IP address is statically determined, the settings 150a enable the user to enter the static IP address, as well as the address of the desired Subnet and associated Gateway for the ECU. The settings 150b further allow the user to indicate whether the DNS server for the ECU is to be dynamically or statically determined. In the case where the DNS server for the ECU is statically determined, the settings, the settings 150b enable the user to indicate IP addresses of both a primary and secondary DNS server. The network settings 150 are examples of living environment characteristics that may be significant in allowing the ECU to operate correctly within a local network.

Figure 11:
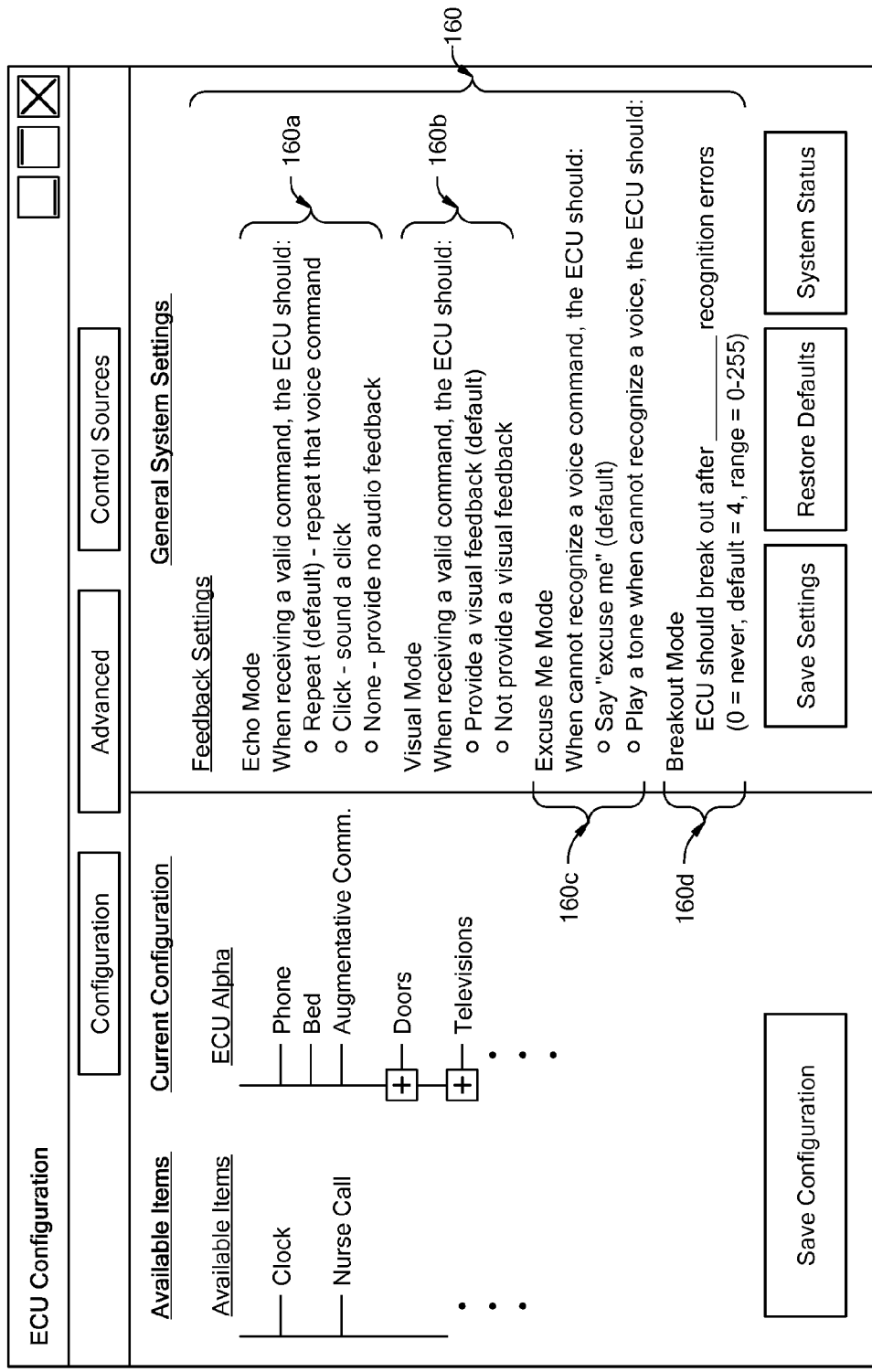
FIG. 11 is a simplified screen shot showing a portion of a user interface provided by an embodiment of the disclosed system to enable a user to enter user characteristics for one or more ECUs.

FIG. 11 is a simplified screen shot showing a portion of a user interface provided by an embodiment of the disclosed system to enable a user to enter user characteristics for one or more ECUs. As shown in FIG. 11, a number of feedback settings 160 are made accessible to the user. The feedback settings 160 are stored as one or more user characteristics. The feedback settings 160 include echo mode settings 160*a*, which allow a user to indicate the action the ECU takes after it receives a valid command from the user. In the example of FIG. 11, the user can indicate that either the correctly received command should be repeated, such that a voice command successfully received from the user is played back, or that a click sound should be generated after the correct receipt of a command, or that no audio feedback should be generated after the correct receipt of a command. The visual mode settings 160*b* enable a user to indicate whether any visual feedback is to be provided by the ECU after correct receipt of a user command. Such visual feedback may, for example, consist of a light or light emitting diode (LED) being lit or flashed upon correct receipt of a user command, in the case where visual feedback is desired by the user. The breakout mode settings 160*d* enable the user to indicate a threshold number of recognition errors, after which the ECU will move back up to a higher level menu within a menu tree. For example, if the breakout mode threshold is set to 10, then after 10 command recognition errors the ECU would stop presenting the current menu options, and move back up one or more layers to provide a higher level menu, or a top level menu.

Figure 12:
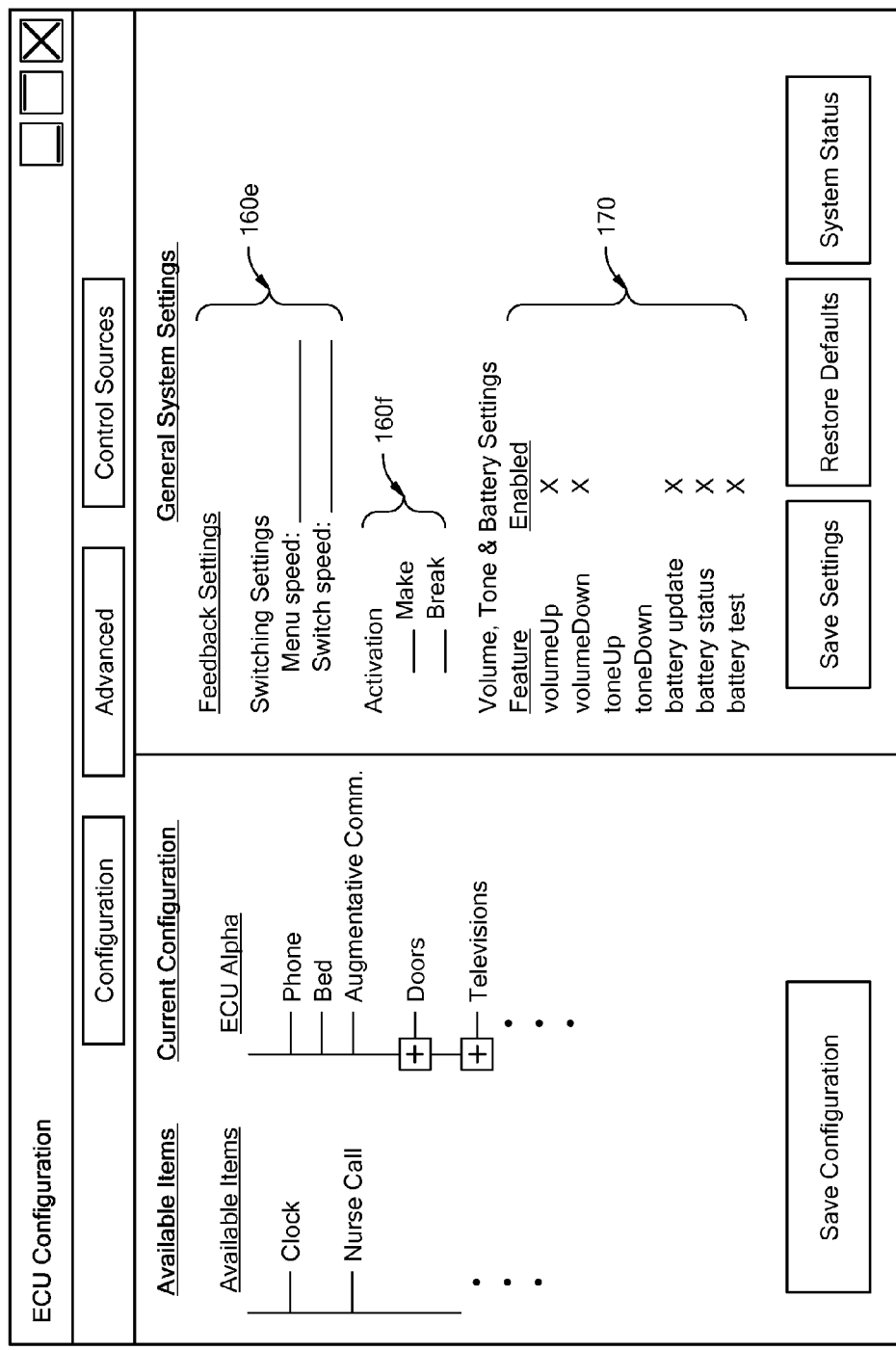
FIG. 12 is a simplified screen shot showing a portion of a user interface provided by an embodiment of the disclosed system to enable a user to enter user characteristics for one or more ECUs.

FIG. 12 is a simplified screen shot showing a portion of a user interface provided by an embodiment of the disclosed system to enable a user to enter user characteristics for one or more ECUs. As shown in FIG. 12, the feedback settings 160 may further include switching settings 160*a*, which allow the user to enter a menu speed, that is the time between menu items when the ECU reads out or otherwise provides the items in a menu to the user. Additionally, the switching settings 160*e* further enable the user to enter a switch speed, which defines a period of time for which the ECU will block out inputs received from the user after an initial input is received through a user interface switch device. As noted above, such a switch speed characteristic is appropriate for a disabled user that may be subject to shaking or spasticity, which might cause them to continue pressing a switch or other input device after they initially press it, or to press it repeatedly when they only intend to press it once.

The activation settings 160*f* enable the user to indicate whether switch activation for a user interface device, such as a pressure plate, head pointer, sip and puff switch, or other user interface device, is when the connection is activated ("Make") or broken ("Break"). This user setting further helps tailor the ECU operation to the specific disability of the user.

The volume tone and battery settings 170 enable the user to control whether certain ECU interface features are enabled and check certain hardware associated with or contained within the ECU. Through the settings 170, the user can indicate whether the volume up, volume down, tone up and tone down controls are enabled on the ECU. The settings 170 further allow the user to enable a battery check feature that is based on software executing in the ECU that periodically checks a battery that is attached to the ECU. For example, in the illustrative embodiment of FIG. 12, the user can enable a battery update feature that periodically checks the time when the battery attached to the ECU was changed, and displays or otherwise reports that most recent battery change. The battery status feature checks, displays or otherwise reports the current charge status of the battery attached to the ECU, and the battery test feature periodically tests the battery to determine whether it is operable.

Figure 13:
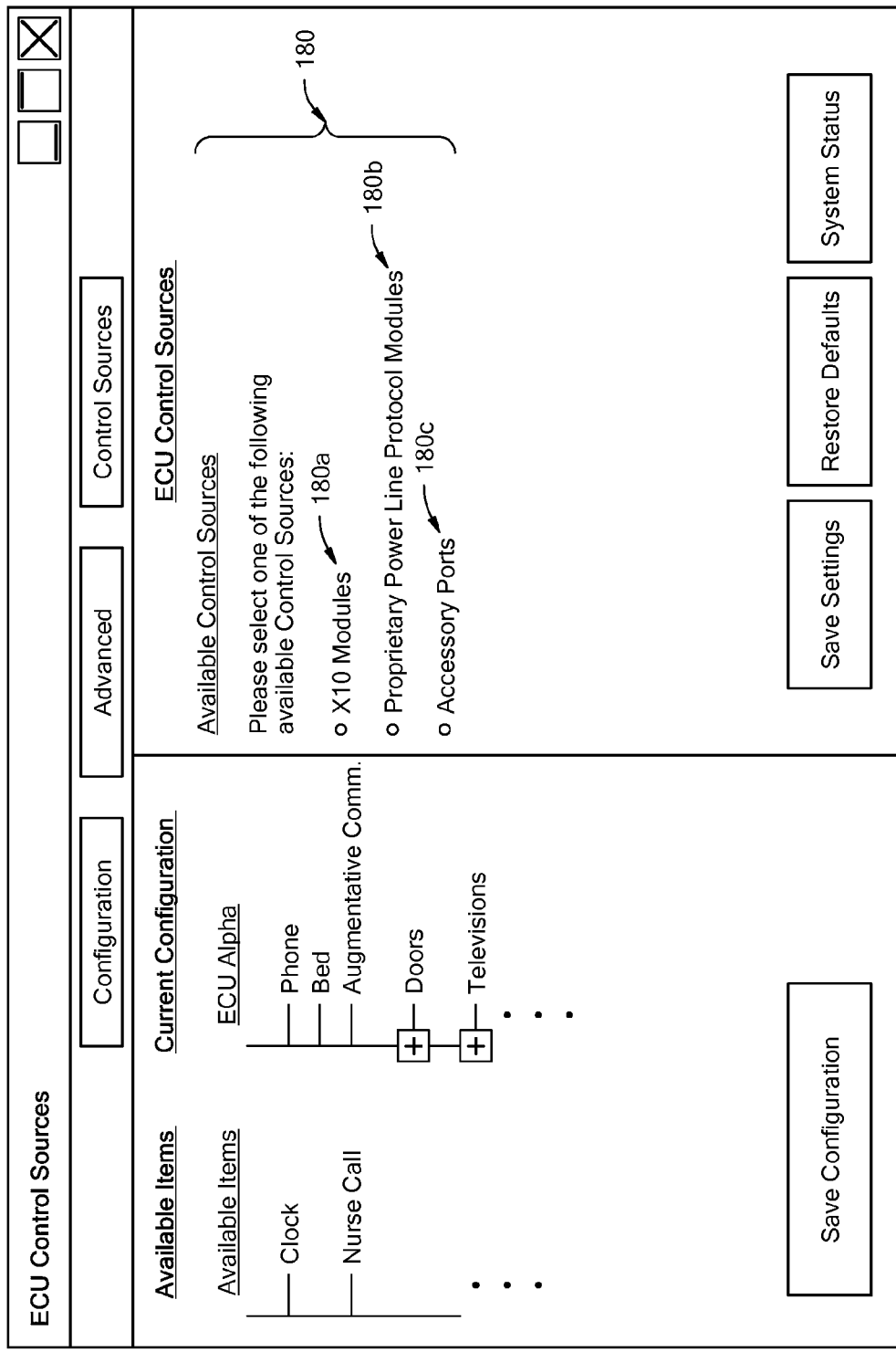
FIG. 13 is a simplified screen shot showing a portion of a user interface provided by an embodiment of the disclosed system to enable a user to configure a number of control sources that interface to the ECU.

FIG. 13 is a simplified screen shot showing a portion of a user interface provided by an embodiment of the disclosed system to enable a user to configure a number of control sources that interface to the ECU. As shown in FIG. 13, the user can select from a number of control source types 180, shown for purposes of illustration as including X10 modules 180*a*, proprietary power line protocol modules 180*b* and accessory ports 180*c*. The user clicks on one of the control source types 180 to define settings associated with input devices that the user uses to communicate with the ECU, or to define settings that are associated with living environment devices that are controlled by the ECU.

Figure 14:
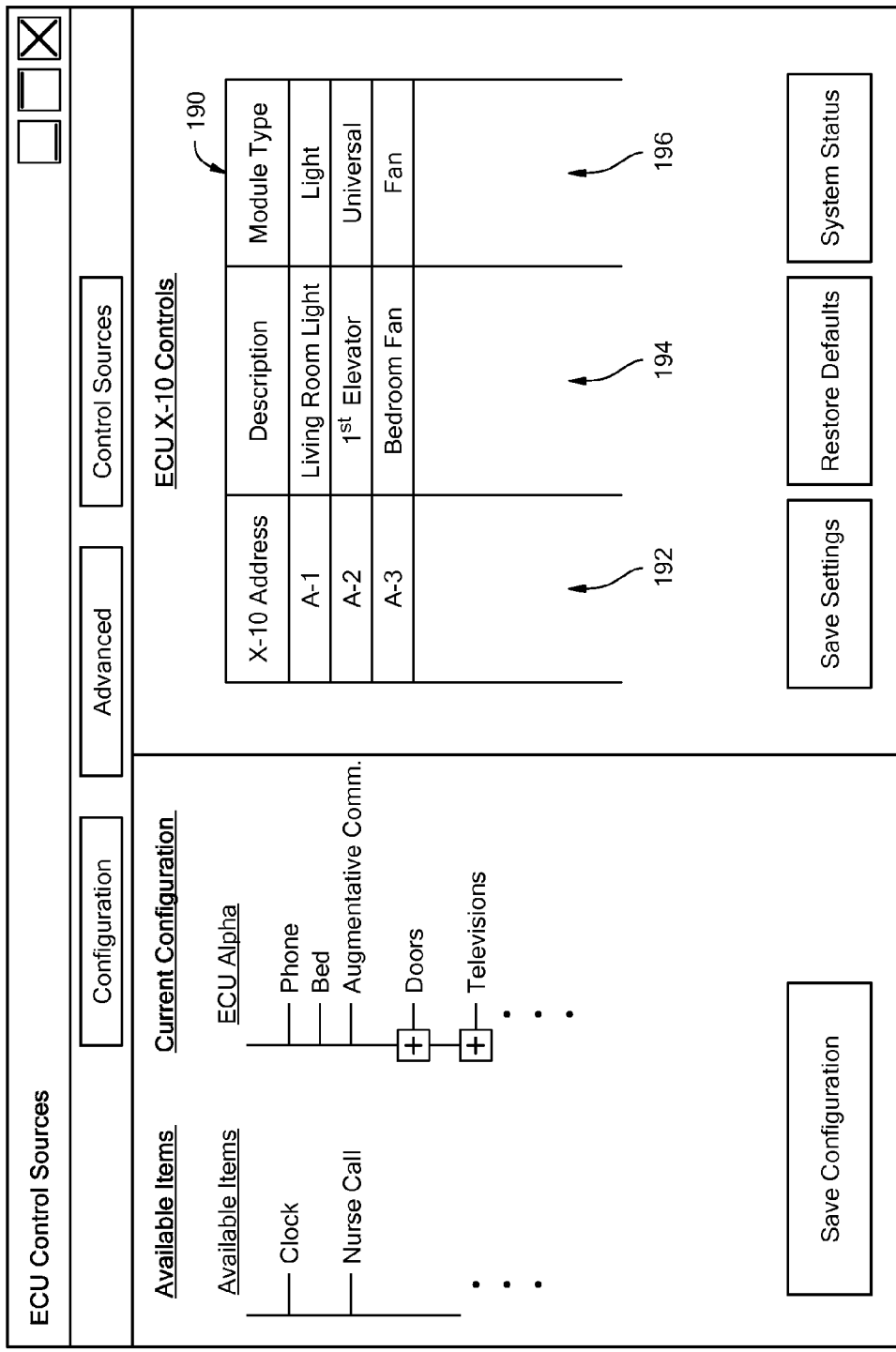
FIG. 14 is a simplified screen shot showing a portion of a user interface provided by an embodiment of the disclosed system to enable a user to configure a number of control sources that interface to the ECU using a first communication protocol.

FIG. 14 is a simplified screen shot showing a portion of a user interface provided by an embodiment of the disclosed system to enable a user to configure a number of control sources that interface to the ECU using a first communication protocol, for example as might be displayed in response to the user clicking on or otherwise selecting the control source types 180*a* (X10 modules) shown in FIG. 13. As shown in FIG. 14, the table 190 includes a number of rows, each of which is associated with a living environment device that is controlled by way of an X-10 communication protocol address contained in the column 192. The living environment device for a row in the table 190 is further associated with a description in the column 194, and has a module type indicated in the column 190. The values displayed in and accessible to user through the table 190 are examples of living environment characteristics. Each of the living environment devices defined by a row in the table 190 becomes available as a control source in a configuration option table for a set of related devices, such as the configuration option table 110 shown in FIG. 7 for televisions in the living environment. In this way the disclosed system allows living environment characteristics, such as an X-10 address that identifies a control source in the table 190, to be associated with one or more user characteristics, such as the audio commands that may be defined through the table 110 in the interface of FIG. 7.

Figure 15:
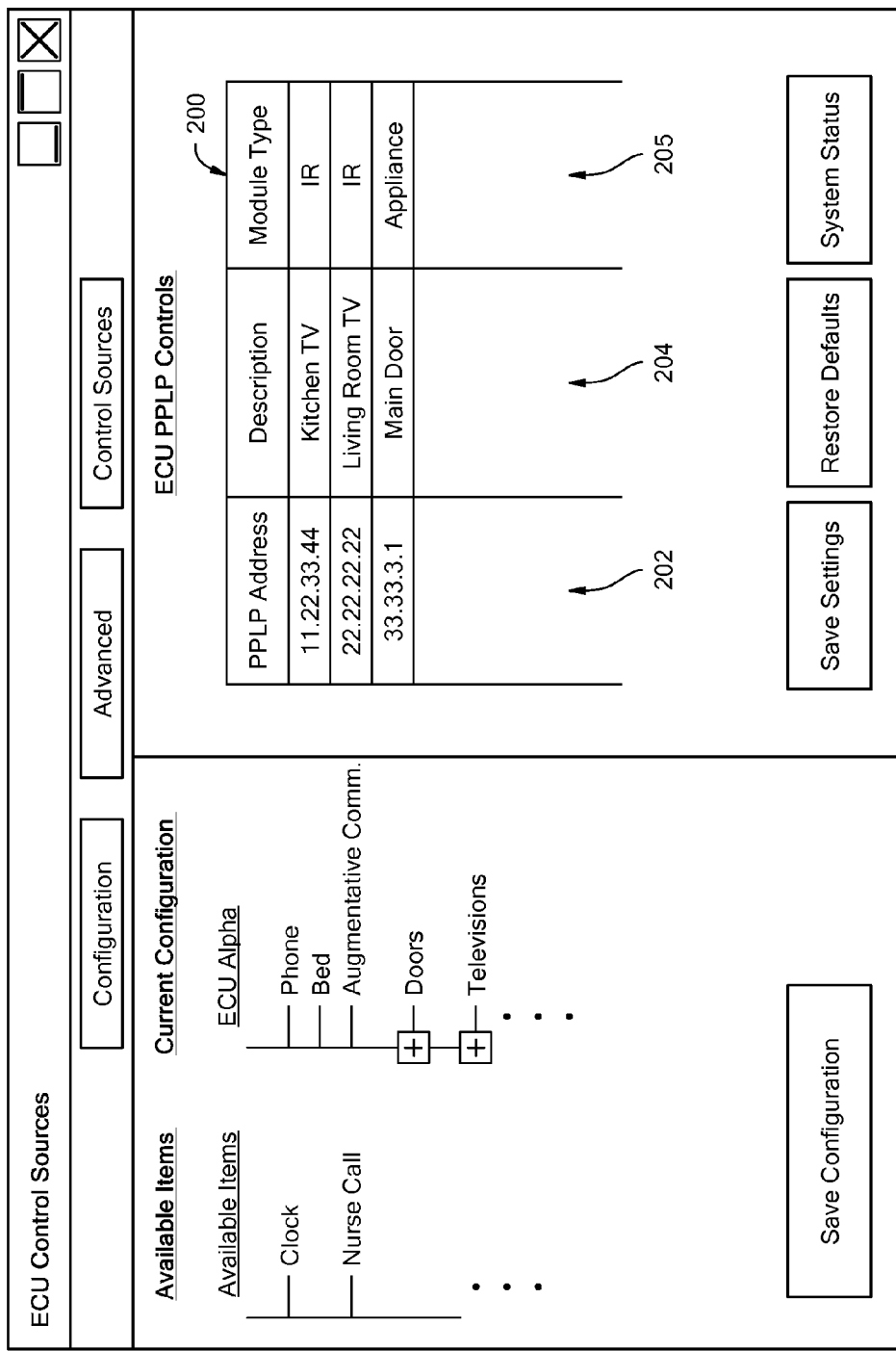
FIG. 15 is a simplified screen shot showing a portion of a user interface provided by an embodiment of the disclosed system to enable a user to configure a number of control sources that interface to the ECU using a second communication protocol.

FIG. 15 is a simplified screen shot showing a portion of a user interface provided by an embodiment of the disclosed system to enable a user to configure a number of control sources that interface to the ECU using a proprietary power line communication protocol (PPLP), for example as might be displayed in response to the user clicking on or otherwise selecting the control source types 180*b* (Proprietary Power Line Protocol modules) shown in FIG. 13. As shown in FIG. 15, the table 200 includes a number of rows, each of which is associated with a living environment device that is controlled by way of a PPLP address contained in the column 202. The living environment device for a row in the table 200 is further associated with a description in the column 2044, and has a module type indicated in the column 200. The values displayed in and accessible to user through the table 200 are examples of living environment characteristics. Each of the living environment devices defined by a row in the table 200 becomes available as a control source in a configuration option table for a set of related devices, such as the configuration option table 110 shown in FIG. 7 for televisions in the living environment. In this way the disclosed system allows living environment characteristics, such as proprietary power line communication protocol address that identifies a control source in the table 200, to be associated with one or more user characteristics, such as the audio commands that may be defined through the table 110 in the interface of FIG. 7.

Figure 16:
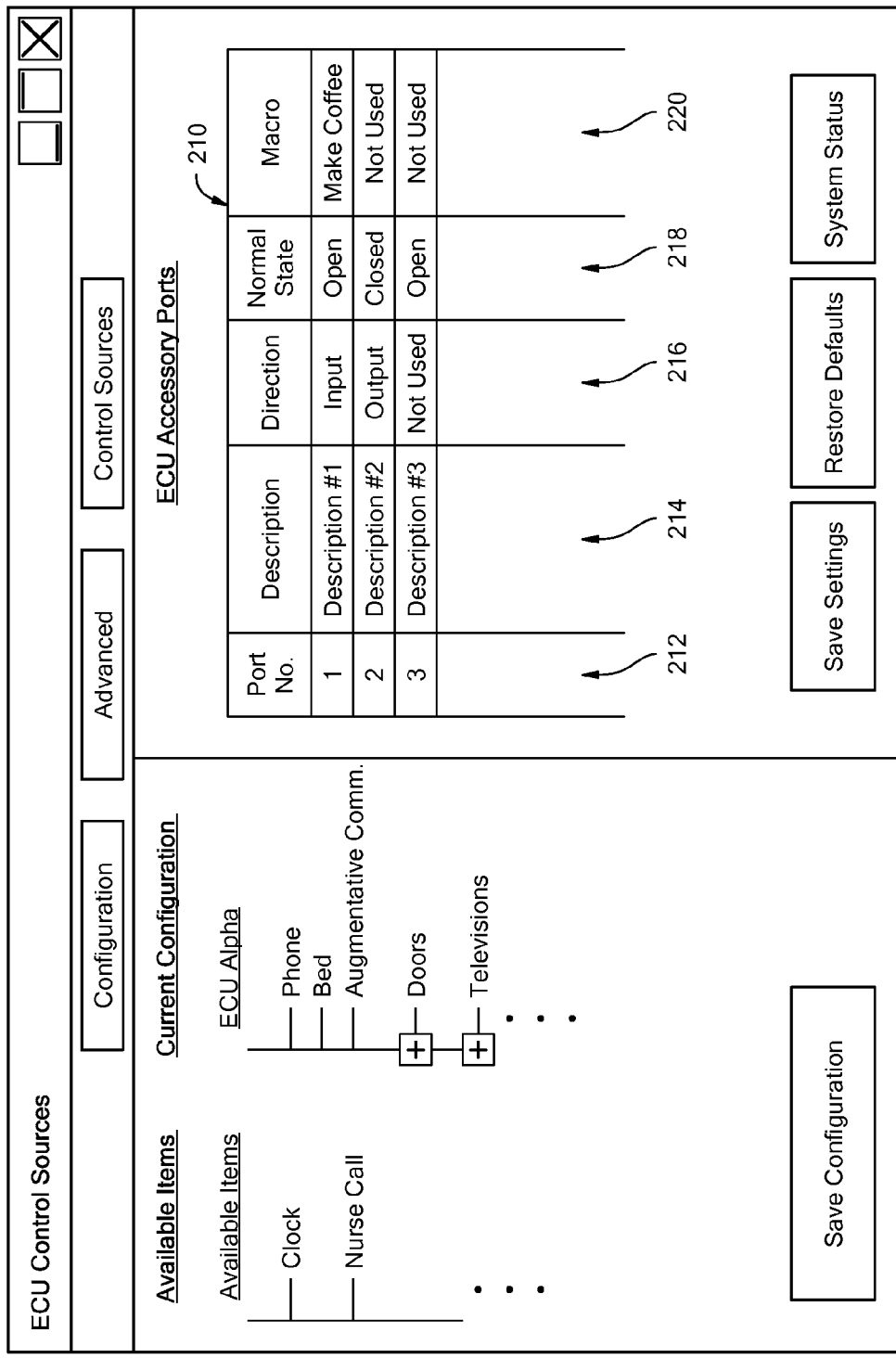
FIG. 16 is a simplified screen shot showing a portion of a user interface provided by an embodiment of the disclosed system to enable a user to configure a number of control sources that interface to the ECU using a number of accessory ports.

FIG. 16 is a simplified screen shot showing a portion of a user interface provided by an embodiment of the disclosed system to enable a user to configure a number of control sources that interface to the ECU through a number of built in accessory ports, for example as might be displayed in response to the user clicking on or otherwise selecting the control source types 180*c* (Accessory Ports) shown in FIG.

13. As shown in FIG. 16, the table 210 includes a number of rows, each of which is associated with a living environment device that is controlled by way of an accessory communication port built into the ECU, the port number of which is contained in the column 212. The living environment device for a row in the table 210 is further associated with a description in the column 214, and may be either an input device from the user to the ECU, or an output device, as defined by the direction column 216. A column 218 defines a normal state for the device connected through the accessory communication port indicated in column 212. The table 210 can further be used to define a series of operations defined by a macro name listed in column 220. For output devices, the values displayed in and accessible to user through the table 210 are examples of living environment characteristics. For input devices, the values displayed in and accessible to the user through the table 210 are examples of user characteristics. Each of the output devices defined by a row in the table 210 becomes available as a control source in a configuration option table for a set of related devices, such as the configuration option table 110 shown in FIG. 7 for televisions in the living environment. In this way the disclosed system allows living environment characteristics, such as a port number that identifies a communication port for a controlled device in the table 210, to be associated with one or more user characteristics, such as the audio commands that may be defined through the table 110 in the interface of FIG. 7.

Figure 17:
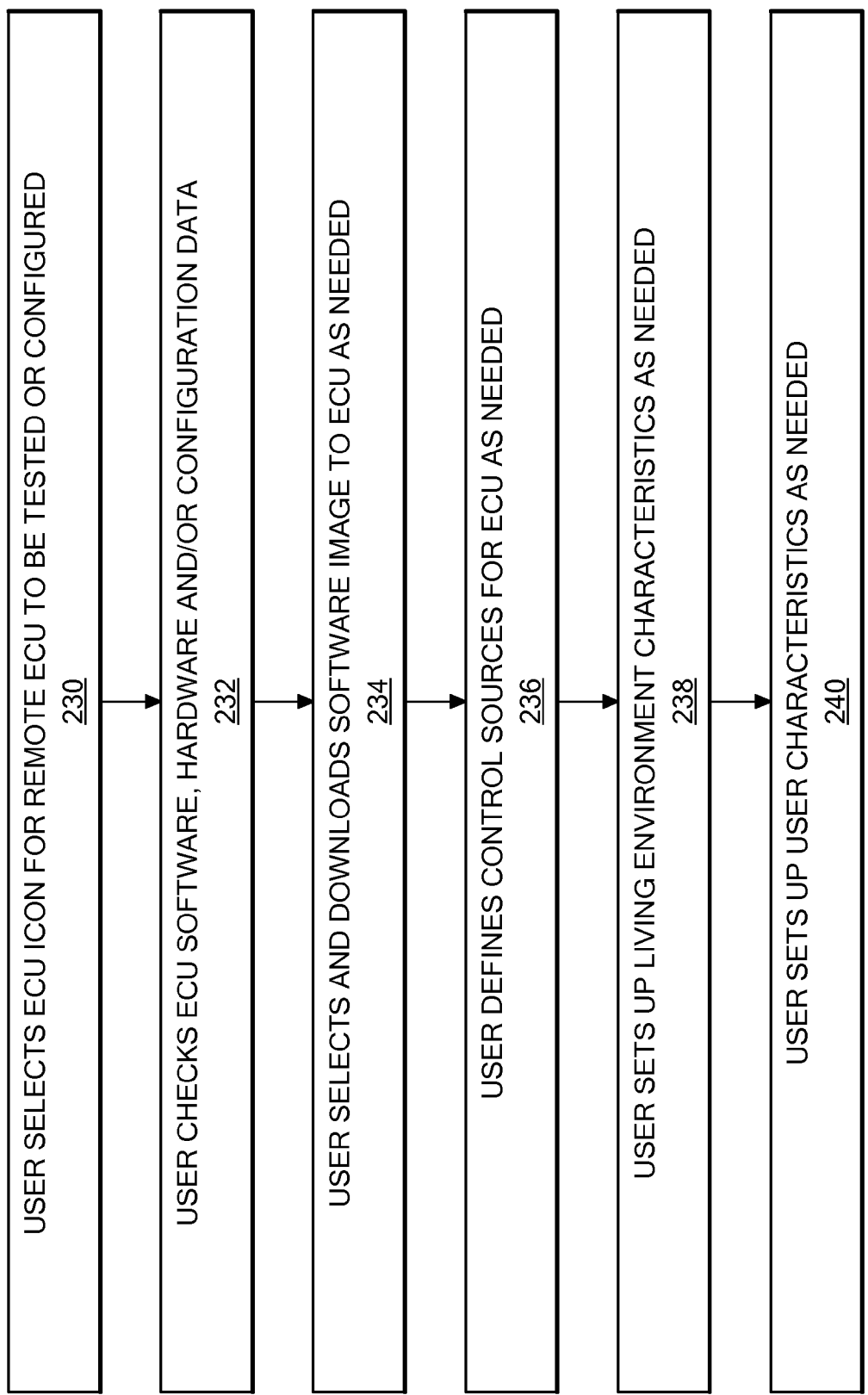
FIG. 17 is a flow chart illustrating steps performed in an illustrative embodiment of the disclosed system to access a remote ECU using the disclosed administration tool software program to perform maintenance and/or configuration operations.

FIG. 17 is a flow chart illustrating steps performed in an illustrative embodiment of the disclosed system to access a remote ECU using the disclosed administration tool software program to perform maintenance and/or configuration operations. Those skilled in the art will recognize that the order of the steps shown in FIG. 7 are exemplary only, and that other orders may be used in accordance with the disclosed system. Similarly, those skilled in the art will recognize that one or more of the steps shown in FIG. 7 may be omitted during a specific use case involving an embodiment of the disclosed system. The steps of the flow chart in FIG. 7 may be performed through the administrator user interface 18 of FIG. 1.

At step 230, a user selects an ECU icon for a remote ECU to be tested or configured. At step 232, the user checks the currently loaded ECU software, hardware and/or configuration data as needed for debugging, maintenance, and/or configuration purposes. At step 234, the user may select and download a new software image to the selected ECU as may be needed. At step 236, the user defines a number of control sources as may be needed, such as input devices through which a user communicates with the ECU, and/or output devices through which a user controls one or more living environment devices. As mentioned above, some aspects of the control sources set up at step 236 may be user characteristics, whereas other aspects of the control sources set up at step 236 may be living environment characteristics. At step 238, the user sets up living environment characteristics as may be needed, and at step 240 the user sets up user characteristics as may be needed. Subsequent to the steps of FIG. 17, the living environment characteristics defined at steps 236 and 238 may be uploaded into a living environment profile stored in a configuration profile database, and the user characteristics defined at steps 236 and 240 may be uploaded into a user profile stored in the configuration profile database.

FIGS. 1, 3, 4 and 17 are block diagram and flowchart illustrations of methods, apparatus(s) and computer program products according to an embodiment of the invention. It will be understood that each block of FIGS. 1, 3, 4 and 17, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that they may be embodied using a variety of specific command structures.

The invention claimed is:

1. A method of managing a network of environmental control units, comprising:
   independently storing and retrieving individual ones of a plurality of environmental control unit user profiles to and from an environmental control unit configuration profile database;
   independently storing and retrieving individual ones of a plurality of living environment profiles to and from said environmental control unit configuration profile database;
   wherein each of said environmental control unit user profiles is made up of user specific environmental control unit configuration information associated with a corresponding one of a plurality of environmental control unit users; and
   wherein each of said living environment profiles is made up of living environment specific environmental control unit configuration information for at least one living environment device located in an associated living environment; and
   generating a living environment device selection user interface displaying a list of selectable living environment device representations, wherein each of said selectable living environment device representations corresponds to a type of living environment device that can be controlled through said remotely located environmental control unit, and wherein said living environment device selection user interface further displays a representation of a current configuration of a remotely located environmental control unit, and wherein said living device selection user interface enables a user to move said selectable living environment device representations into said representation of said current configuration of said remotely located environmental control unit.

2. The method of claim 1, further comprising:
sending, in response to detecting said user moving one of said selectable living environment device representations into said representation of said current configuration of said remotely located environmental control unit, a command message over a computer network to said remotely located environmental control unit, said command message indicating that said remotely located environmental control unit should perform at least one operation to allow a user to control a living environment device of said type corresponding to said one of said living environment device representations moved into said representation of said current configuration of said remotely located environmental control unit.

3. The method of claim 1, wherein said living environment device selection user interface enables said user to move said selectable living environment device representations into said representation of said current configuration of said remotely located environmental control unit by enabling said user to click on said selectable living environment device representations and move said selectable living environment device representations into said representation of said current configuration of said remotely located environmental control unit by dragging said selectable living environment device representations over said representation of said current configuration of said remotely located environmental control unit.

4. The method of claim 1, further comprising:
independently downloading a user specified one of said plurality of environmental control unit user profiles and a user specified one of said plurality of living environment profiles into a user specified one of a plurality of environmental control units, said user specified one of said plurality of environmental control units, user specified one of said plurality of environmental control unit user profiles and said user specified one of said plurality of living environment profiles each individually selected by a user through a configuration profile selection user interface.

5. The method of claim 1, further comprising generating a living environment device configuration user interface that enables said user to indicate at least one living environment device characteristic associated with said living environment device of said type corresponding to said one of said living environment device representations moved into said representation of said current configuration of said remotely located environmental control unit.

6. The method of claim 5, further comprising generating a user characteristic configuration user interface that enables said user to indicate at least one user characteristic associated with said living environment device of said type corresponding to said one of said living environment device representations moved into said representation of said current configuration of said remotely located environmental control unit.

7. The method of claim 6, further comprising generating a feedback setting user interface that enables said user to indicate at least one user characteristic comprising a feedback setting indicating how said remotely located environmental control unit provides feedback to said user.

8. The method of claim 1, wherein said user specific environmental control unit configuration information for each of said environmental control unit user profiles reflects a disability of said corresponding one of said plurality of environmental control unit users.

9. The method of claim 8, wherein said user specific environmental control unit configuration information for each of said environmental control unit user profiles further reflects at least one physical characteristic of said corresponding one of said plurality of environmental control unit users.

10. The method of claim 9, wherein said user specific environmental control unit configuration information for each of said environmental control unit user profiles further reflects at least one preference of said one of said plurality of corresponding environmental control unit users.

11. The method of claim 1, wherein said living environment specific control unit configuration information for each of said living environment profiles includes information describing how said at least one living environment device can be controlled by an environmental control unit.

12. A system for of managing a network of environmental control units, said system including administration tool program code stored on a computer readable medium, said administration tool program code comprising:
program code operable to independently store and retrieve individual ones of a plurality of environmental control unit user profiles to and from an environmental control unit configuration profile database;
program code operable to independently store and retrieving individual ones of a plurality of living environment profiles to and from said environmental control unit configuration profile database;
wherein each of said environmental control unit user profiles is made up of user specific environmental control unit configuration information associated with a corresponding one of a plurality of environmental control unit users; and
wherein each of said living environment profiles is made up of living environment specific environmental control unit configuration information for at least one living environment device located in an associated living environment; and
program code operable to generate a living environment device selection user interface displaying a list of selectable living environment device representations, wherein each of said selectable living environment device representations corresponds to a type of living environment device that can be controlled through said remotely located environmental control unit, and wherein said living environment device selection user interface further displays a representation of a current configuration of a remotely located environmental control unit, and wherein said living device selection user interface enables a user to move said selectable living environment device representations into said representation of said current configuration of said remotely located environmental control unit.

13. A system for managing a network of environmental control units, comprising:
means for independently storing and retrieving individual ones of a plurality of environmental control unit user profiles to and from an environmental control unit configuration profile database;
means for independently storing and retrieving individual ones of a plurality of living environment profiles to and from said environmental control unit configuration profile database;

wherein each of said environmental control unit user profiles is made up of user specific environmental control unit configuration information associated with a corresponding one of a plurality of environmental control unit users; and wherein each of said living environment profiles is made up of living environment specific environmental control unit configuration information for at least one living environment device located in an associated living environment; and means for generating a living environment device selection user interface displaying a list of selectable living environment device representations, wherein each of said selectable living environment device representations corresponds to a type of living environment device that can be controlled through said remotely located environmental control unit, and wherein said living environment device selection user interface further displays a representation of a current configuration of a remotely located environmental control unit, and wherein said living device selection user interface enables a user to move said selectable living environment device representations into said representation of said current configuration of said remotely located environmental control unit.

* * * * *